US011849397B2

(12) United States Patent
Raghavan et al.

(10) Patent No.: US 11,849,397 B2
(45) Date of Patent: Dec. 19, 2023

(54) TECHNIQUES FOR ENABLING POWER SAVINGS WITH PHASE SHIFTER CONFIGURATIONS

(71) Applicant: QUALCOMM Incorporated, San Diego, CA (US)

(72) Inventors: Vasanthan Raghavan, West Windsor Township, NJ (US); Kang Yang, San Diego, CA (US); Raghu Narayan Challa, San Diego, CA (US); Shrenik Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 17/398,924

(22) Filed: Aug. 10, 2021

(65) Prior Publication Data

US 2023/0047558 A1 Feb. 16, 2023

(51) Int. Cl.
*H04W 52/02* (2009.01)
*H04W 72/20* (2023.01)

(52) U.S. Cl.
CPC ....... *H04W 52/0235* (2013.01); *H04W 72/20* (2023.01)

(58) Field of Classification Search
CPC .................. H04W 52/0235; H04W 72/20
See application file for complete search history.

(56) References Cited

U.S. PATENT DOCUMENTS

| 8,929,489 | B2* | 1/2015 | Vervisch-Picois ...... G01S 19/11 375/345 |
| 2017/0134205 | A1* | 5/2017 | Kim .................... H04L 27/2623 |
| 2018/0342802 | A1* | 11/2018 | Lyu ........................ H01Q 3/267 |
| 2019/0199410 | A1* | 6/2019 | Zhao ..................... H04W 24/08 |
| 2019/0379429 | A1* | 12/2019 | Chang .................... H04B 7/043 |
| 2020/0220749 | A1* | 7/2020 | Zhao ................... H04L 25/0204 |
| 2021/0344384 | A1* | 11/2021 | Dunna ................. H04B 7/0413 |
| 2022/0185368 | A1* | 6/2022 | Kim ...................... B62D 5/0472 |
| 2022/0236362 | A1* | 7/2022 | Da ......................... G01S 5/0246 |

OTHER PUBLICATIONS

Chen Y., et al., "Reconfigurable Intelligent Surface Assisted Device-to-Device Communications", Arxiv.Org, Cornell University Library, 201 Olin Library Cornell University Ithaca, NY 14853, Jul. 2, 2020, XP081713483, pp. 1-11.

(Continued)

*Primary Examiner* — Dominic E Rego
(74) *Attorney, Agent, or Firm* — Dalei Dong; Holland & Hart LLP

(57) ABSTRACT

Methods, systems, and devices for wireless communications are described. A communications device may transmit, to a second communications, a request to update a phase shifter configuration. The first communications device may receive, from the second communications device and in response to the request, a response accepting the request to update the phase shifter configuration. The first communications device may then transmit, to the second communications device, an uplink transmission in accordance with the updated phase shifter configuration based on receiving the response. The first communications device may include a first user equipment (UE) and the second communications device may include a second UE or a base station.

30 Claims, 15 Drawing Sheets

(56) References Cited

OTHER PUBLICATIONS

Gong S., et al., "Towards Smart Wireless Communications via Intelligent Reflecting Surfaces: A Contemporary Survey", arxiv.org, Cornell University Library, 201 Olin Library Cornell University Ithaca, NY 14853, May 19, 2020, XP081666434, pp. 1-31, Chapter D, p. 13, abstract figures 1-9, I. Introduction, II. Theory and Design of Intelligent Reflecting Surfaces, III. Performance Analysis, IV. Application and Optimization, V. Emerging Use Cases, VI. Challenges and Future Research.
International Search Report and Written Opinion—PCT/US2022/037088—ISA/EPO—dated Oct. 26, 2022.
Ji Z., et al., "Reconfigurable Intelligent Surface Assisted Device-to-Device Communications", arxiv.org, Cornell University Library, 201 Olin Library Cornell University Ithaca, NY 14853, Jul. 5, 2021, XP091007837, pp. 1-11.
Wu Q., et al., "Intelligent Reflecting Surface-Aided Wireless Communications: A Tutorial", IEEE Transactions on Communications, IEEE Service Center, Piscataway, NJ. USA, vol. 69, No. 5, May 2021, XP011855356, pp. 3313-3351.

\* cited by examiner

TECHNIQUES FOR ENABLING POWER SAVINGS WITH PHASE SHIFTER CONFIGURATIONS

FIELD OF TECHNOLOGY

The following relates to wireless communications, including techniques for enabling power savings with phase shifter configurations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications devices (such as UEs) may be equipped with multiple antenna elements in an antenna array to support beamforming. To facilitate beamforming techniques, a wireless communications device may use a phase shifter to set phase values across the antenna elements. However, in some wireless communications devices, communication techniques using phase shifters may be deficient in terms of power consumed in relation to accrued performance gain tradeoffs.

SUMMARY

The described techniques relate to improved methods, systems, devices, and apparatuses that support techniques for enabling power savings with phase shifter configurations. A first communications device (e.g., a transmitting device) may transmit a request to update a phase shifter configuration. A second communications device (e.g., receiving device) may receive the request, and may transmit a response accepting the request. The first and second communications devices may then update the respective phase shifter configurations, based on the accepted request. For example, the first communications device may shift to a lower phase shifter precision from a higher phase shifter precision. The second communications device may shift to a higher phase shifter precision from a lower phase shifter precision to compensate for precision loss and a consequent loss in beamforming gain. The first communications device may then send an uplink transmission in accordance with the updated phase shifter configuration.

A method for wireless communication at a first communications device is described. The method may include transmitting, to a second communications device, a request to update a phase shifter configuration, receiving, from the second communications device and in response to the request, a response accepting the request to update the phase shifter configuration, and transmitting, to the second communications device, an uplink transmission in accordance with the updated phase shifter configuration based on receiving the response.

An apparatus for wireless communication at a first communications device is described. The apparatus may include a processor, memory coupled with the processor, and instructions stored in the memory. The instructions may be executable by the processor to cause the apparatus to transmit, to a second communications device, a request to update a phase shifter configuration, receive, from the second communications device and in response to the request, a response accepting the request to update the phase shifter configuration, and transmit, to the second communications device, an uplink transmission in accordance with the updated phase shifter configuration based on receiving the response.

Another apparatus for wireless communication at a first communications device is described. The apparatus may include means for transmitting, to a second communications device, a request to update a phase shifter configuration, means for receiving, from the second communications device and in response to the request, a response accepting the request to update the phase shifter configuration, and means for transmitting, to the second communications device, an uplink transmission in accordance with the updated phase shifter configuration based on receiving the response.

A non-transitory computer-readable medium storing code for wireless communication at a first communications device is described. The code may include instructions executable by a processor to transmit, to a second communications device, a request to update a phase shifter configuration, receive, from the second communications device and in response to the request, a response accepting the request to update the phase shifter configuration, and transmit, to the second communications device, an uplink transmission in accordance with the updated phase shifter configuration based on receiving the response.

In some examples of the method, apparatuses, and non-transitory computer-readable medium described herein, transmitting the request for the update to the phase shifter configuration may include operations, features, means, or instructions for transmitting, to the second communications device, the request to update the phase shifter configuration from a first phase shifter precision value to a second phase shifter precision value, where the first phase shifter precision value may be associated with a higher power consumption than the second phase shifter precision value. Some examples of the method, apparatuses, and non-transitory computer-readable medium described herein may further include operations, features, means, or instructions for receiving, from the second communications device and based on transmitting the request, the updated phase shifter configuration in accordance with the second phase shifter precision value.

In some examples of the method, apparatuses, and non-transitory computer-readable medium described herein, receiving the response accepting the update to the phase shifter configuration may include operations, features, means, or instructions for receiving, from the second communications device, an indication of a second phase shifter configuration corresponding to the updated phase shifter configuration, where the second phase shifter configuration may be used for reception of the uplink transmission.

In some examples of the method, apparatuses, and non-transitory computer-readable medium described herein, transmitting the request for the update to the phase shifter configuration may include operations, features, means, or instructions for transmitting, to the second communications device, the request to update the phase shifter configuration from a first phase shifter precision value to a second phase shifter precision value, where the second phase shifter precision value may be associated with a lower precision than the first phase shifter precision value.

Some examples of the method, apparatuses, and non-transitory computer-readable medium described herein may further include operations, features, means, or instructions for determining that the second communications device may be capable of supporting a second phase shifter configuration corresponding to the updated phase shifter configuration, where transmitting the request for the update to the phase shifter configuration may be based on determining that the second communications device may be capable of supporting the second phase shifter configuration. In some examples of the method, apparatuses, and non-transitory computer-readable medium described herein, the second phase shifter configuration may be associated with a higher precision value and power consumption than the updated phase shifter configuration.

Some examples of the method, apparatuses, and non-transitory computer-readable medium described herein may further include operations, features, means, or instructions for applying the updated phase shifter configuration to set one or more phase values, where transmitting the uplink transmission includes transmitting the uplink transmission in accordance with the one or more phase values.

In some examples of the method, apparatuses, and non-transitory computer-readable medium described herein, the first communications device includes a user equipment (UE) and the second communications device includes a base station. In some examples of the method, apparatuses, and non-transitory computer-readable medium described herein, the first communications device includes a first UE and the second communications device includes a second UE.

A method for wireless communication at a second communications device is described. The method may include receiving, from a first communications device, a request to update a phase shifter configuration, transmitting, to the first communications device and in response to the request, a response accepting the request to update the phase shifter configuration, and receiving, from the first communications device, an uplink transmission in accordance with the updated phase shifter configuration based on transmitting the response.

An apparatus for wireless communication at a second communications device is described. The apparatus may include a processor, memory coupled with the processor, and instructions stored in the memory. The instructions may be executable by the processor to cause the apparatus to receive, from a first communications device, a request to update a phase shifter configuration, transmit, to the first communications device and in response to the request, a response accepting the request to update the phase shifter configuration, and receive, from the first communications device, an uplink transmission in accordance with the updated phase shifter configuration based on transmitting the response.

Another apparatus for wireless communication at a second communications device is described. The apparatus may include means for receiving, from a first communications device, a request to update a phase shifter configuration, means for transmitting, to the first communications device and in response to the request, a response accepting the request to update the phase shifter configuration, and means for receiving, from the first communications device, an uplink transmission in accordance with the updated phase shifter configuration based on transmitting the response.

A non-transitory computer-readable medium storing code for wireless communication at a second communications device is described. The code may include instructions executable by a processor to receive, from a first communications device, a request to update a phase shifter configuration, transmit, to the first communications device and in response to the request, a response accepting the request to update the phase shifter configuration, and receive, from the first communications device, an uplink transmission in accordance with the updated phase shifter configuration based on transmitting the response.

In some examples of the method, apparatuses, and non-transitory computer-readable medium described herein, receiving the request for the update to the phase shifter configuration may include operations, features, means, or instructions for receiving, from the first communications device, the request to update the phase shifter configuration from a first phase shifter precision value to a second phase shifter precision value, where the first phase shifter precision value may be associated with a higher power consumption than the second phase shifter precision value.

Some examples of the method, apparatuses, and non-transitory computer-readable medium described herein may further include operations, features, means, or instructions for transmitting, to the first communications device and based on transmitting the request, the updated phase shifter configuration in accordance with the second phase shifter precision value.

In some examples of the method, apparatuses, and non-transitory computer-readable medium described herein, transmitting the response accepting the update to the phase shifter configuration may include operations, features, means, or instructions for transmitting, to the first communications device, an indication of a second phase shifter configuration corresponding to the updated phase shifter configuration.

Some examples of the method, apparatuses, and non-transitory computer-readable medium described herein may further include operations, features, means, or instructions for applying the second phase shifter configuration to set one or more phase values and receiving the uplink transmission in accordance with the one or more phase values.

In some examples of the method, apparatuses, and non-transitory computer-readable medium described herein, the second phase shifter configuration may be associated with a higher precision value and power consumption than the updated phase shifter configuration.

In some examples of the method, apparatuses, and non-transitory computer-readable medium described herein, receiving the request for the update to the phase shifter configuration may include operations, features, means, or instructions for receiving, from the first communications device, the request to update the phase shifter configuration from a first phase shifter precision value to a second phase shifter precision value, where the second phase shifter precision value may be associated with a lower precision than the first phase shifter precision value.

In some examples of the method, apparatuses, and non-transitory computer-readable medium described herein, the first communications device includes a UE and the second communications device includes a base station. In some examples of the method, apparatuses, and non-transitory computer-readable medium described herein, the first communications device includes a first UE and the second communications device includes a second UE.

DETAILED DESCRIPTION

Figure 1:
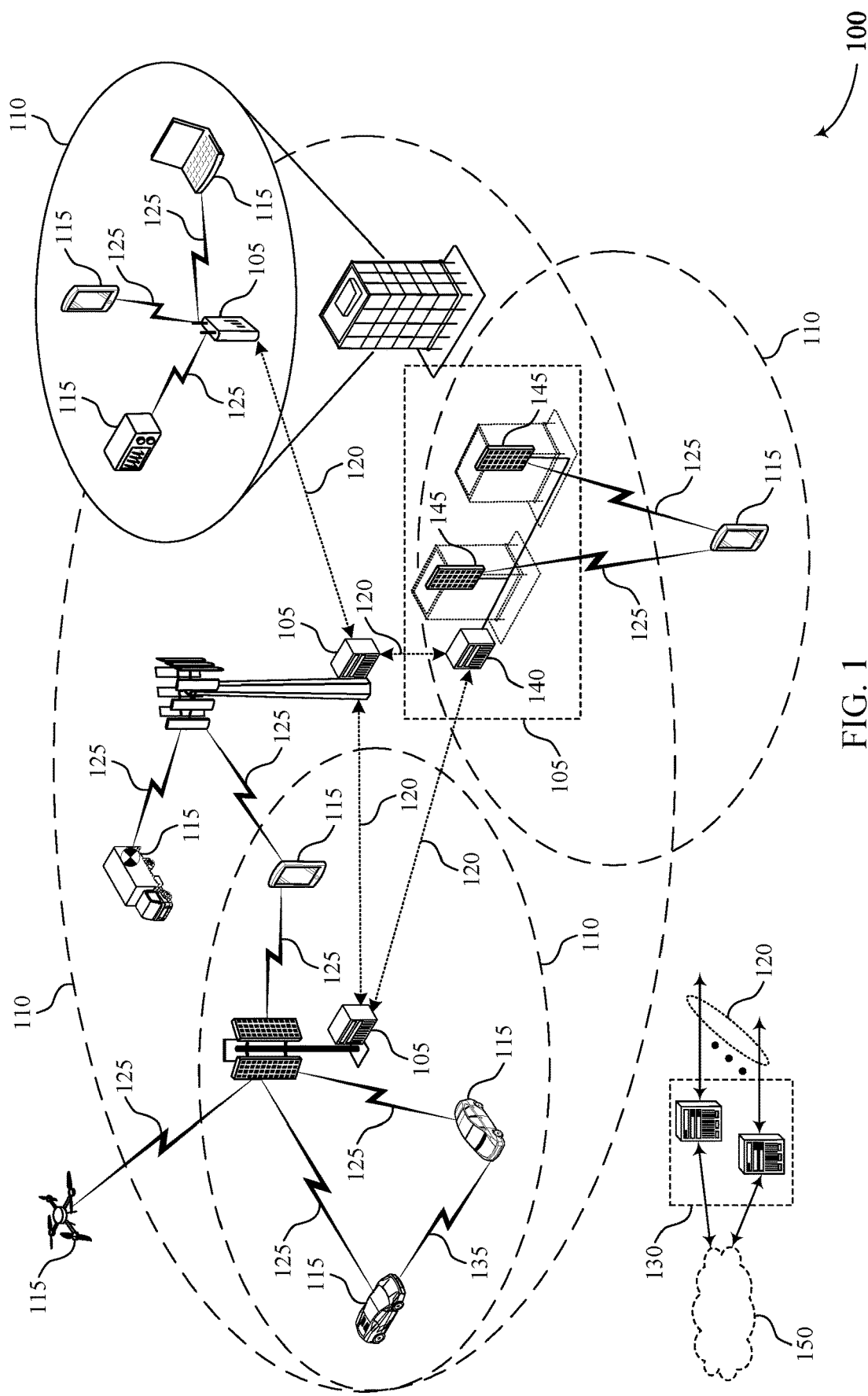
FIG. 1 illustrates an example of a wireless communications system that supports techniques for enabling power savings with phase shifter configurations in accordance with aspects of the present disclosure.

A user equipment (UE) may support connections with a base station or another UE or both. In some wireless communications systems, a UE may have multiple antenna modules or panels (e.g., oriented and distributed in different directions), each of which may have multiple antenna elements. The UE may use multiple receive beams for each antenna module that covers different angles of arrival of clusters in the channel to the base station or another UE. In some examples, wireless communications devices (e.g., UEs) may be equipped with multiple antenna elements in an antenna array to support beamforming. Wireless communications devices (UEs and base stations) may use phase shifters to set phase values across the antenna elements. Phase shifters providing higher precisions may also consume more power than phase shifters providing lower precisions. For example, a phase shifter may obtain a higher precision by using a larger number of nominal phase values or a lower phase shift precision by using a smaller number of nominal phase values. For example, a 2-bit phase shifter may obtain four phase values (e.g., 0°, 90°, 180°, 270°), where each phase value relies on an in-phase (I) part of the circuit or a quadrature (Q) part of the circuit, but not both. Similarly, a 3-bit phase shifter may obtain eight phase values (e.g., 0°, 45°, 90°, 135°, 180°, 225°, 270°, 315°), where the four additional phase values may rely on both an I part of the circuit and a Q part of the circuit in combination. Due to the increased number of active parts of the circuit, phase shifters with higher precisions may consume more power than phase shifters with lower precisions.

Various aspects of the present disclosure relate to a power to precision tradeoff to facilitate more efficient power consumption. According to aspects depicted herein, wireless communication devices may enable power saving techniques, by agreeing to operate using different phase shifter configurations. Specifically, a first device (e.g., a transmitting device) may signal a request to update its phase shifter configuration. For example, the first device may transmit a signal including a request to modify (e.g., lower) its phase shifter precision to conserve power. A second device (e.g., receiving device) may receive the signal, determine a set of power constraints, and may respond by accepting the request. The first and second device may then update their respective phase shifter configurations, based on the accepted request. For example, the first device may shift to a lower phase shifter precision (e.g., from a 3-bit configuration to a 2-bit configuration) while the second device may shift to a higher phase shifter precision (e.g., from a 2-bit configuration to a 3-bit configuration) to compensate for precision loss. The first device may then send an uplink transmission in accordance with the updated phase shifter configurations.

Particular aspects of the subject matter described herein may be implemented to realize one or more advantages. The described techniques may support improvements in wireless communications systems by reducing signaling overhead. Further, in some examples, updating phase shifter configuration, as described herein, may support higher data rates, thereby improving latency and reliability. As such, supported techniques may include improved network operations, and, in some examples, may promote network efficiencies, among other benefits.

Aspects of the disclosure are initially described in the context of wireless communications systems. Examples of processes and signaling exchanges that support power savings with phase shifter configurations are then described. Aspects of the disclosure are further illustrated by and described with reference to apparatus diagrams, system diagrams, and flowcharts that relate to techniques for enabling power savings with phase shifter configurations.

FIG. 1 illustrates an example of a wireless communications system 100 that supports techniques for enabling power savings with phase shifter configurations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

According to one or more aspects of the present disclosure, a UE 115 may transmit, to a second communications device, a request to update a phase shifter configuration. For example, the UE 115 may transmit to another UE 115 or to a base station 105, a request to update a phase shifter configuration. In some cases, the request to update the phase shifter configuration may include updating from a first phase shifter precision value to a second phase shifter precision value. The first phase shifter precision value may be associated with a higher power consumption than the second phase shifter precision value. The second phase shifter precision value may also be associated with a lower precision than the first phase shifter precision value. In some cases, the UE 115 may receive, from the second communications device, a response accepting the request to update the phase shifter configuration. The response may include an indication of a second phase shifter configuration, corresponding to the updated phase shifter configuration, for reception of uplink transmissions. For example, the second phase shifter configuration may be associated with a higher precision value and power consumption than the updated phase shifter configuration. The UE 115 may then transmit, to the second communications device, an uplink transmission in accordance with the updated phase shifter configuration, based on receiving the response.

Figure 2:
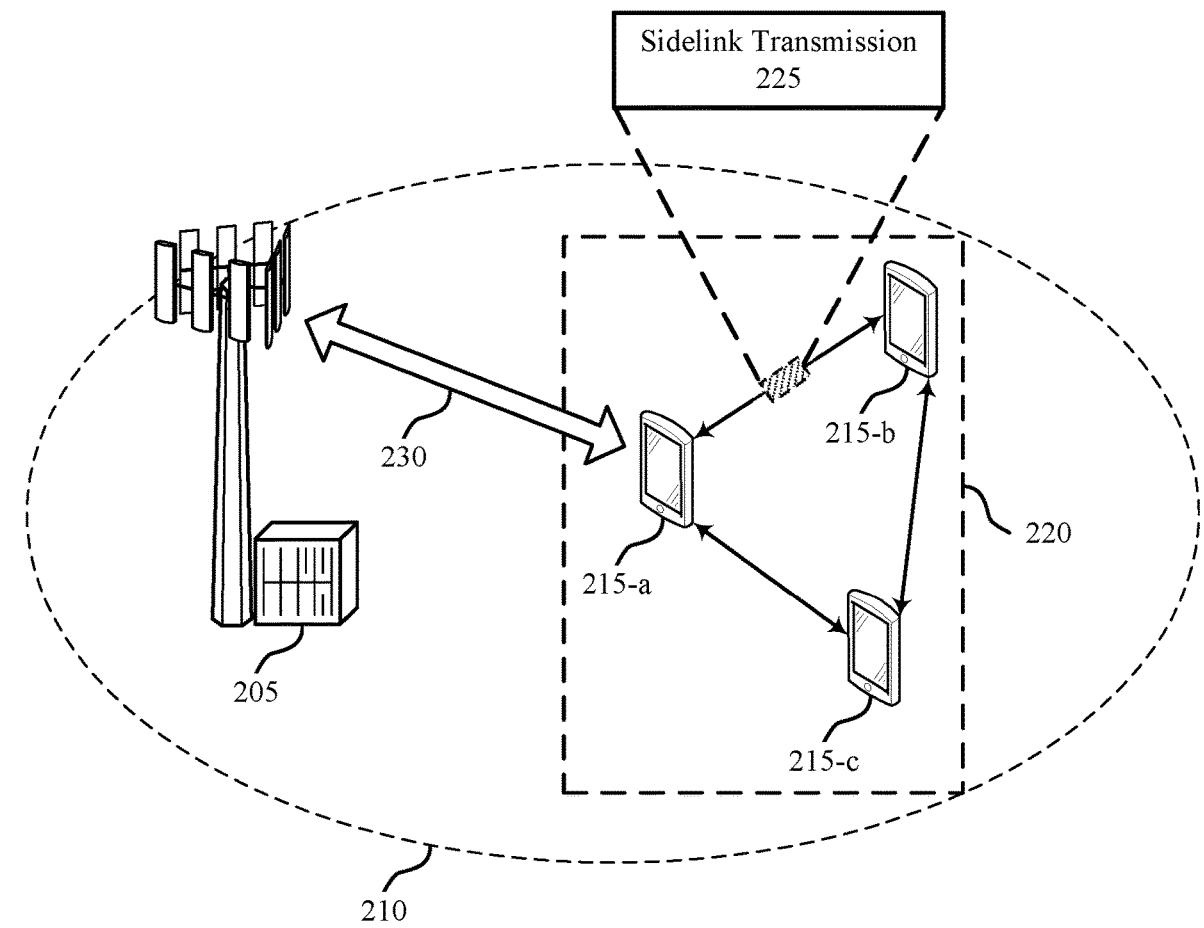
FIG. 2 illustrates an example of a wireless communications system that supports techniques for enabling power savings with phase shifter configurations in accordance with aspects of the present disclosure.

FIG. 2 illustrates an example of a wireless communications system 200 that supports techniques for enabling power savings with phase shifter configurations in accordance with aspects of the present disclosure. In some examples, the wireless communications system 200 may implement aspects of the wireless communications system 100 as described with reference to FIG. 1. The wireless communications system 200 may include a geographic area 210, a base station 205, and one or more UEs 215 (may also be referred to as communications devices).

In some examples, the wireless communications system 200 may utilize control signaling to schedule resources for the UEs 215 to perform sidelink communications. Additionally or alternatively, the UEs 215 in the wireless communications system 200 may utilize shared information to enhance scheduling, inter-UE coordination, and communications flexibility. In some examples, the group of UEs 215 (e.g., UE 215-a (UE 1), UE 215-b (UE 2), and UE 215-c (UE 3)) may communicate with each other (within a V2X system, a D2D system, among other examples) and may employ sidelink transmissions to save power, reduce latency, and ensure reliable communications. In some examples, vehicles may communicate using V2X resource allocation mode 2 (that utilizes UE autonomous resource selection).

The wireless communications system 200 may support both access links and sidelinks for communications between one or more communication devices. An access link may refer to a communication link between a UE 215 (such as, UE 215-a, UE 215-b and UE 215-c) and a base station 205. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE to one or more other UEs.

The base station 205 may communicate with one or more UEs 215 (for example, UEs 215-a, UE 215-b, and UE 215-c), which may be included within a UE group 220. For example, the base station 205 may transmit a control signal (via communication link 230) to the UE 215-a (UE 1), the UE 215-b (UE 2), or the UE 215-c (UE 3). As depicted herein, sidelink communications may support communications within a group of UEs 215 (for example, UE group 220). For instance, sidelink communications may include communications between a UE (such as, UE 215-a, UE 215-b, and UE 215-c) and other UEs 215 within a coverage area including the group of UEs (for example, a coverage area provided by a base station, a coverage area outside of the coverage area provided by the base station, or a combination thereof).

As depicted in the example of FIG. 2, the UE 215-a, the UE 215-b, and the UE 215-c may communicate with each other (or with another group of UEs 215) over sidelink communications (for example, using a peer-to-peer (P2P) or D2D protocol). In some examples, the UE 215-a may transmit sidelink transmission 225 to the UE 215-b or the UE 215-c. In some examples, the UE 215-a or the UE 215-b may monitor resource pools for the sidelink communications or indications of the sidelink communications (for example, resource reservations, control channel transmissions, among other examples) from other UEs 215 in the group. Additionally or alternatively, the UEs 215 may have data (e.g., sidelink transmission 225) to transmit to (or receive from) a UE 215 in the UE group 220 and may use the sidelink communications to transmit the data transmission. In some examples, the UE group 220 of the UEs 215 may utilize sidelinks communications in addition to access links with the base station 205. In such examples, a UE 215 may communicate with the base station 205 via a Uu interface (for example, the base station 205 may transmit downlink communications to the UE 215 via an access link).

The UEs 215 and the base station 205 may use multiple antennas to communicate in mmW systems. Beamforming from multiple antennas may bridge the link budget. In some examples, the UEs 215 and the base station 205 may use phase shifters to set phase values across antenna elements in an antenna array. Phase shifters may consume a small amount of power (relative to the radio frequency chain) at mmW frequencies. As phase shifter precision increases, the power consumed by the phase shifter is independent of the phase value. Phase shifters may consume a larger fraction of the power on a receiver path than on a transmitter path. Since the bandwidth of receiver components (e.g., low noise amplifiers) may be larger than the bandwidth of transmitter components (e.g., power amplifiers), in wireless communications systems supporting ultra-wide bandwidth coverage (e.g., >10 GHz), more antenna elements may have a larger number of receiver paths than transmitter paths. Phase shifters may also consume different amounts of power for different phase shift values at low precision. The precision differential may depend on the radio frequency architecture (e.g., phase shifters on the line of a signal path, etc.) as well as a frequency of operation.

According to some aspects, a B-bit phase shifter may quantize a 360 degree phase space into $2^B$ choices or values. For example, a 2-bit phase shifter may obtain four phase values (e.g., 0°, 90°, 180°, 270°). In a phase shifter implementation, the four phase values may be generated as corresponding to either the I part of the circuitry or the Q part of the circuitry (but not both) which is part of the I-Q circuitry (e.g., inherent in vector modulator type phase shifters). In addition, a 3-bit phase shifter may obtain eight phase values (e.g., 0°, 45°, 90°, 135°, 180°, 225°, 270°, 315°). Phase shifters having more than two bits may use of both I and Q circuits to generate a precise phase shift. Thus, a 2-bit phase shifter may consume less power as only one part of the I-Q circuitry is used for a phase shift. The power savings in changing a phase shifter from a 3-bit phase shifter (or more) to a 2-bit phase shifter may be determined by the radio frequency (RF) architecture (e.g., whether the phase shifter is on the line of signal path). However, a performance (e.g., precision) may degrade from a 3-bit phase shifter (or more) to a 2-bit phase shifter. Thus, the different phase shifter configurations may allow for a power-performance tradeoff.

According to one or more aspects, the wireless communications system 200 may support aspects of a power to precision tradeoff. The UE 215 may determine to use a phase shifter configuration that adjusts phase shifter precision, based on a link condition (e.g., associated with higher gains), an available power level, a radio frequency architecture associated with power savings, or a frequency of operation. For example, the UE 215-a may experience power constraints while communicating with a second communications device, such as the base station 205, the UE 215-b, or the UE 215-c. As described herein, the UE 215-a and the base station 205 may enable power saving techniques by agreeing to operate using different phase shifter configurations. Thus, devices (the UE 215 well as the base station 205) may determine whether to use a choice of phase shifter that trades off power consumption with performance. For example, the UE 215-a may transmit, to the second communications device, a request to update a phase shifter configuration. In some cases, the updated phase shifter configuration may be associated with a lower phase shifter precision as well as a lower power consumption. In response to transmitting a request to update a phase shifter configuration, the UE 215-a may receive, from the second device, a response accepting the request to update the phase shifter configuration. The UE 215-a may also transmit, to the second device, an uplink transmission in accordance with the updated phase shifter configuration. In some examples, the UE 215-a may transmit, to the second communications device, the request to update the phase shifter configuration from a first phase shifter precision value (e.g., a 3-bit configuration) to a second phase shifter precision value (e.g., a 2-bit configuration). In some examples, the first phase shifter precision value is associated with a higher power consumption than the second phase shifter precision value. Additionally or alternatively, the second phase shifter precision value may be associated with a lower precision than the first phase shifter precision value.

The second communications device may transmit the updated phase shifter configuration in accordance with the second phase shifter precision value. In addition, the second communications device may transmit an indication of a second phase shifter configuration corresponding to the updated phase shifter configuration. The second phase shifter configuration may be used for reception of the uplink transmission. For instance, the second communications device may indicate that it is going to use a 3-bit configuration instead of a 2-bit configuration for decoding uplink transmissions (to compensate for any precision losses incurred due to updating phase shifter configuration at the UE 215-a). In some examples, higher millimeter carrier frequencies (e.g., 60+ GHz) may include their own tradeoff points in terms of power vs. performance than lower millimeter wave carrier frequencies (e.g., 28 GHz or 39 GHz).

In some examples, a precision loss due to a lower phase shifter precision at the UE 215-a may be compensated by a higher phase shifter precision at the second communications device. For example, the base station 205, with fewer power constraints, may update to a second phase shifter configuration, associated with a higher phase shifter precision. The UE 215-a with a more significant power constraint may request, from a second UE 215-b or the base station 205 with relatively less significant power constraints, to update a phase shifter configuration. The UE 215-a may update to a phase shifter configuration associated with a lower phase shifter precision, and the second UE 215-b or the base station 205 may update to a phase shifter configuration associated with a higher phase shifter precision. In some cases, such a switch in phase shifter burden from one node (e.g., UE 215-a) to another node (e.g., UE 215-b or base station 205) may be accomplished using cooperation and signaling between the nodes. The signaling may determine which node performs higher precision phase shifter operation and which node performs lower precision phase shifter operation. Additionally or alternatively, phase shifter quality may be variable for static beams or directional beams as well as adaptive beam weights which correspond to an optimization over the set of phase shifters instead of phase shifters that steer energy in specific directions of beamspace.

As depicted herein, phase shifters may consume less power on transmit paths relative to receive paths since the power amplifiers consume more power than low noise amplifiers, making the contribution of the phase shifter on the receive path relatively greater than on the transmit path. In such cases, the transmitting device may experience less significant power savings when increasing its phase shifter precision. Similarly, the receiving device may experience relatively more significant power constraints and may operate according to lower phase shifter precisions and decreased power consumption. As depicted in the example of FIG. 2, the device transmitting the uplink transmission may be a UE 215 (e.g., UE 215-a), while the device receiving the uplink transmission may be a base station 205 or a second UE 215 (e.g., UE 215-b or UE 215-c).

Figure 3:
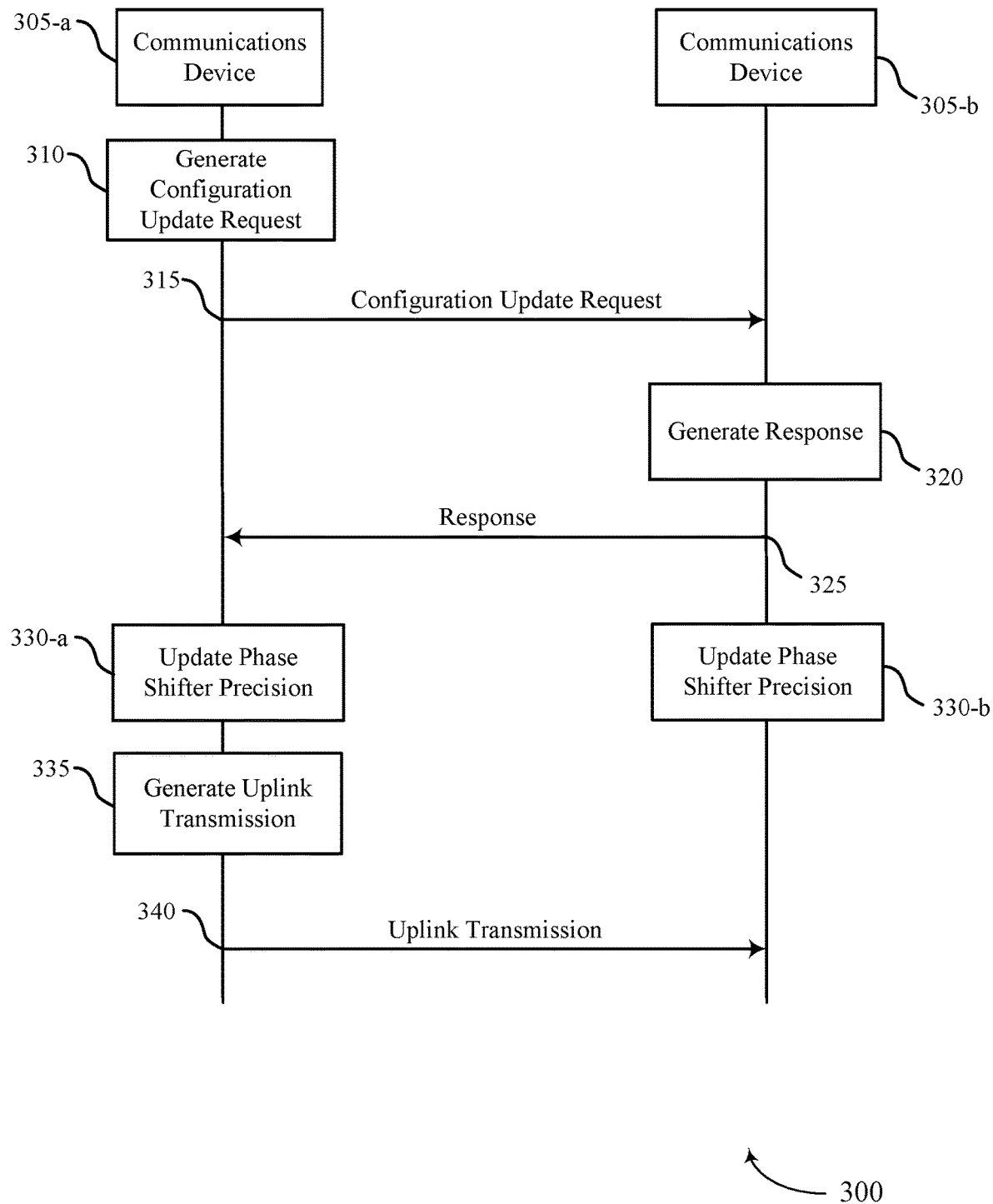
FIG. 3 illustrates an example of a process flow that supports techniques for enabling power savings with phase shifter configurations in accordance with aspects of the present disclosure.

FIG. 3 illustrates an example of a process flow 300 that supports techniques for enabling power savings with phase shifter configurations in accordance with aspects of the present disclosure. In some examples, process flow 300 may implement aspects of wireless communication systems 100 and 200 as described with reference to FIGS. 1 and 2. Process flow 300 may include communications device 305-a and communications device 305-b, which may be examples of techniques performed between a UE 215 and a base station 205, or between multiple UEs 215.

At 310, the communications device 305-a may generate a configuration update request. In some cases, generating the configuration update request may be based on a link condition, an available power level, a radio frequency architecture, or a frequency of operation. In some cases, the configuration update request may include the request to update a phase shifter configuration from a first phase shifter precision value to a second phase shifter precision value. The first phase shifter precision value may be associated with a higher power consumption than the second phase shifter precision value. Similarly, the second phase shifter precision value may be associated with a lower precision than the first phase shifter precision value.

At 315, the communications device 305-a may transmit the configuration update request to communications device 305-b. In some cases, the configuration update request may be transmitted based on determining that the communications device 305-b is capable of supporting a second phase shifter configuration corresponding to the updated phase shifter configuration. The second phase shifter configuration may be associated with a higher precision value and power consumption than the updated phase shifter configuration.

At 320, the communications device 305-b may generate a response, based on receiving the configuration update request. In some cases, the response may include an acceptance of the request to update the phase shifter configuration. In some examples, the response may include the updated phase shifter configuration in accordance with the second phase shifter precision value. The response may also include an indication of a second phase shifter configuration to be used by the communications device 305-b for reception of uplink transmissions.

At 325, the communications device 320 may transmit the response to the communications device 305-a. At 330-a and 330-b, the communications device 305-a and communications device 305-b may update phase shifter precisions associated with the corresponding communications devices. For example, the communications device 305-a may apply the updated phase shifter configuration to set one or more phase values. Similarly, the communications device 305-*b* may apply the second phase shifter configuration to set one or more phase values.

At 335, the communications device 305-*a* may generate an uplink transmission in accordance with the updated phase shifter configuration. At 340, the communications device 305-*a* may transmit the generated uplink transmission to the communications device 305-*b*. In some cases, the uplink transmission may be transmitted in accordance with the one or more phase values of the communications device 305-*a*. Similarly, the uplink transmission may be received in accordance with the one or more phase values of the communications device 305-*b*.

Figure 4:
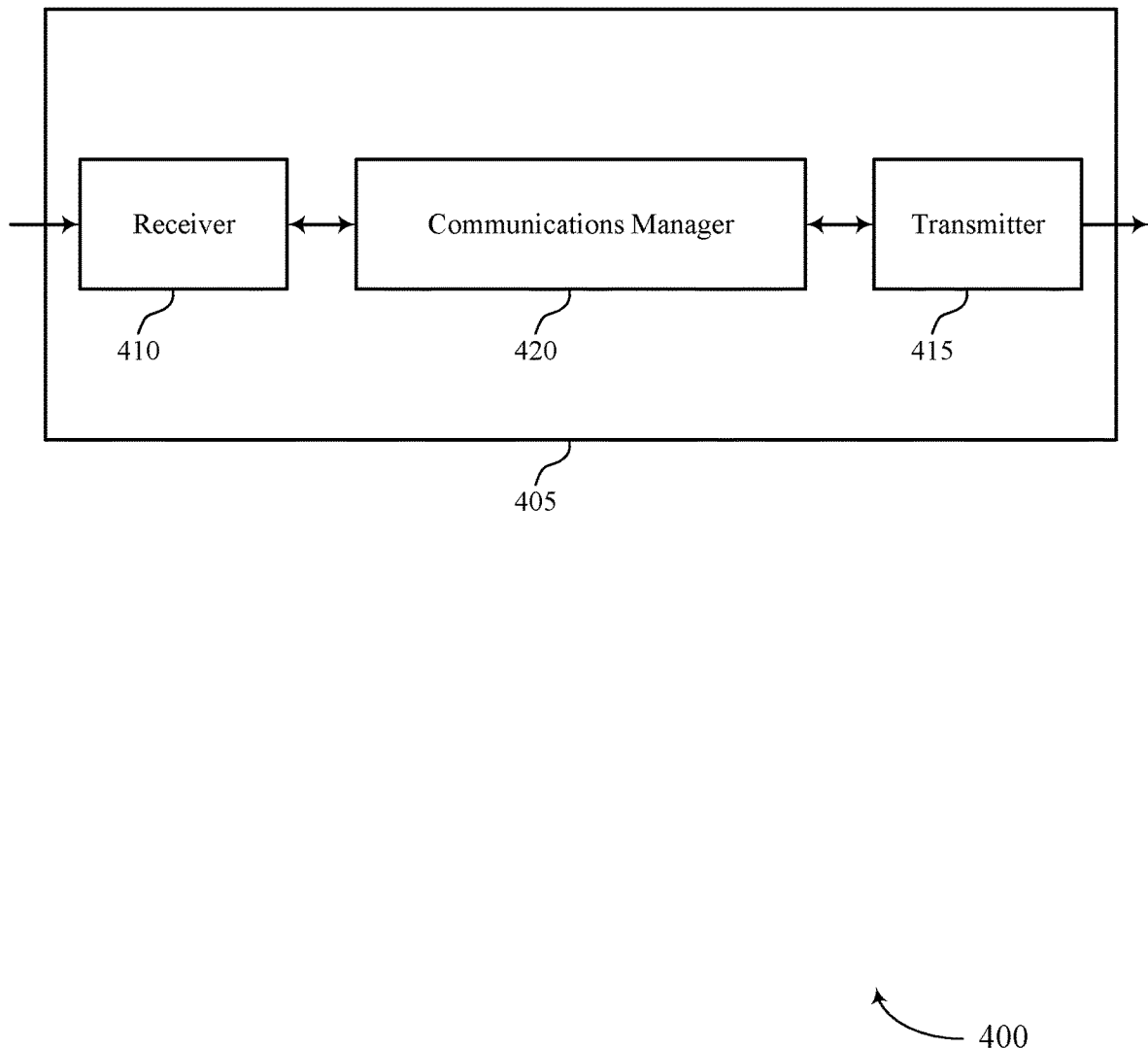
FIGS. 4 and 5 show block diagrams of devices that support techniques for enabling power savings with phase shifter configurations in accordance with aspects of the present disclosure.

FIG. 4 shows a block diagram 400 of a device 405 that supports techniques for enabling power savings with phase shifter configurations in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for enabling power savings with phase shifter configurations). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for enabling power savings with phase shifter configurations). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for enabling power savings with phase shifter configurations as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first communications device in accordance with examples as disclosed herein. For example, the communications manager 420 may be configured as or otherwise support a means for transmitting, to a second communications device, a request to update a phase shifter configuration. The communications manager 420 may be configured as or otherwise support a means for receiving, from the second communications device and in response to the request, a response accepting the request to update the phase shifter configuration. The communications manager 420 may be configured as or otherwise support a means for transmitting, to the second communications device, an uplink transmission in accordance with the updated phase shifter configuration based on receiving the response.

Additionally or alternatively, the communications manager 420 may support wireless communication at a second communications device in accordance with examples as disclosed herein. For example, the communications manager 420 may be configured as or otherwise support a means for receiving, from a first communications device, a request to update a phase shifter configuration. The communications manager 420 may be configured as or otherwise support a means for transmitting, to the first communications device and in response to the request, a response accepting the request to update the phase shifter configuration. The communications manager 420 may be configured as or otherwise support a means for receiving, from the first communications device, an uplink transmission in accordance with the updated phase shifter configuration based on transmitting the response.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing, reduced power consumption, and more efficient utilization of communication resources.

Figure 5:
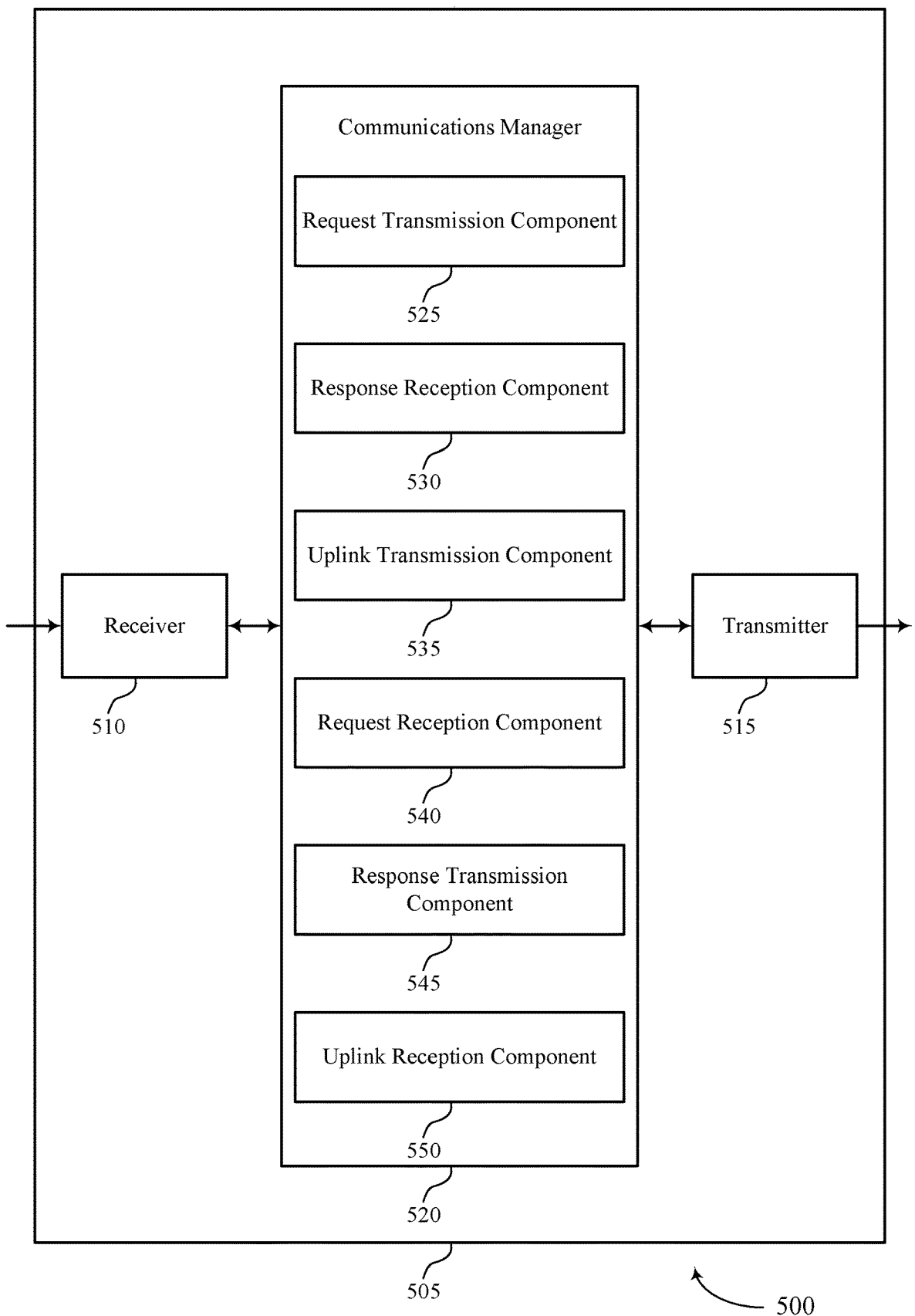

FIG. 5 shows a block diagram 500 of a device 505 that supports techniques for enabling power savings with phase shifter configurations in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for enabling power savings with phase shifter configurations). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for enabling power savings with phase shifter configurations). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for enabling power savings with phase shifter configurations as described herein. For example, the communications manager 520 may include a request transmission component 525, a response reception component 530, an uplink transmission component 535, a request reception component 540, a response transmission component 545, an uplink reception component 550, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first communications device in accordance with examples as disclosed herein. The request transmission component 525 may be configured as or otherwise support a means for transmitting, to a second communications device, a request to update a phase shifter configuration. The response reception component 530 may be configured as or otherwise support a means for receiving, from the second communications device and in response to the request, a response accepting the request to update the phase shifter configuration. The uplink transmission component 535 may be configured as or otherwise support a means for transmitting, to the second communications device, an uplink transmission in accordance with the updated phase shifter configuration based on receiving the response.

Additionally or alternatively, the communications manager 520 may support wireless communication at a second communications device in accordance with examples as disclosed herein. The request reception component 540 may be configured as or otherwise support a means for receiving, from a first communications device, a request to update a phase shifter configuration. The response transmission component 545 may be configured as or otherwise support a means for transmitting, to the first communications device and in response to the request, a response accepting the request to update the phase shifter configuration. The uplink reception component 550 may be configured as or otherwise support a means for receiving, from the first communications device, an uplink transmission in accordance with the updated phase shifter configuration based on transmitting the response.

Figure 6:
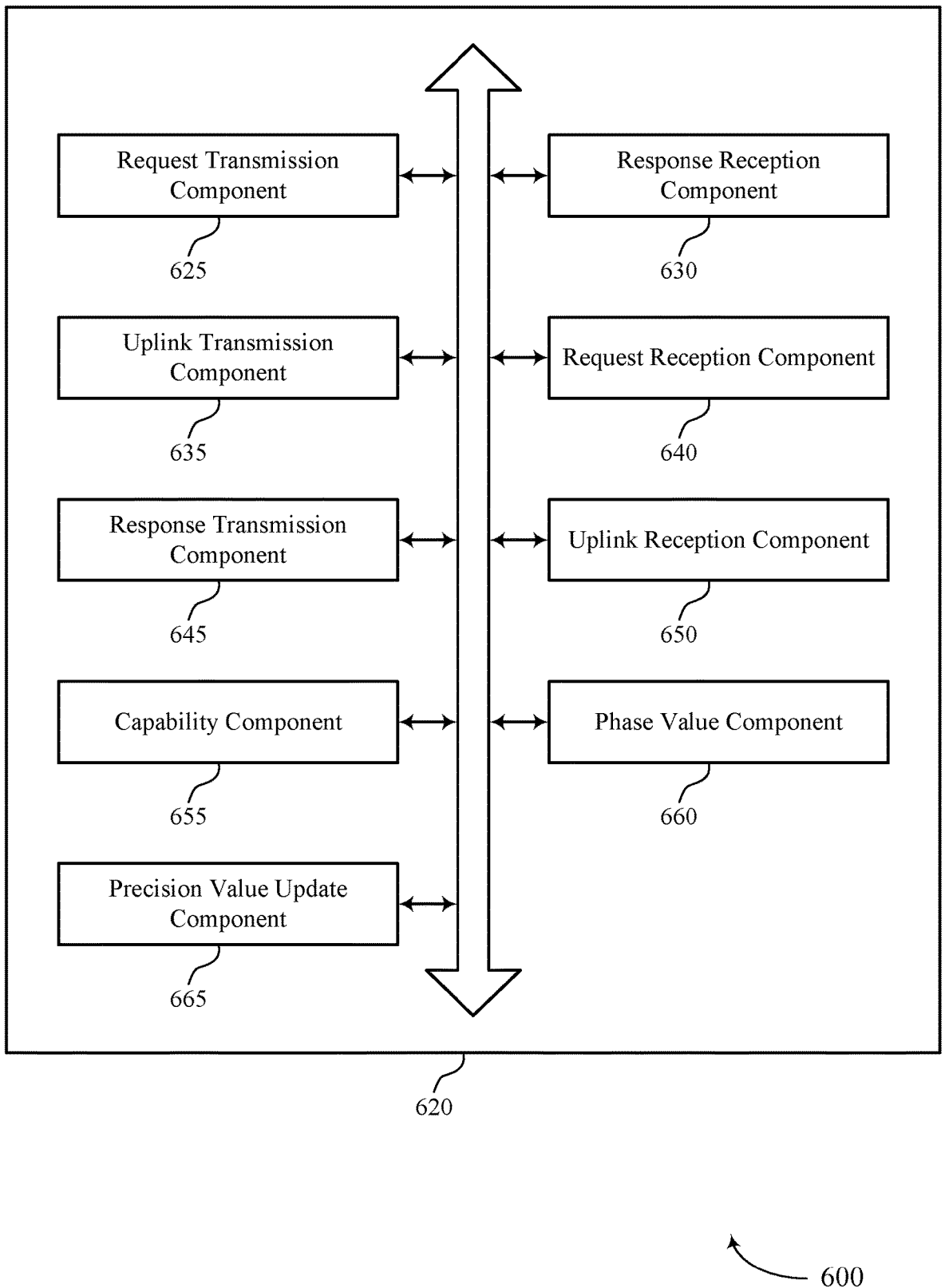
FIG. 6 shows a block diagram of a communications manager that supports techniques for enabling power savings with phase shifter configurations in accordance with aspects of the present disclosure.

FIG. 6 shows a block diagram 600 of a communications manager 620 that supports techniques for enabling power savings with phase shifter configurations in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for enabling power savings with phase shifter configurations as described herein. For example, the communications manager 620 may include a request transmission component 625, a response reception component 630, an uplink transmission component 635, a request reception component 640, a response transmission component 645, an uplink reception component 650, a capability component 655, a phase value component 660, a precision value update component 665, or any combination thereof. Each of these components may communicate, directly or indirectly, with one another (e.g., via one or more buses).

The communications manager 620 may support wireless communication at a first communications device in accordance with examples as disclosed herein. The request transmission component 625 may be configured as or otherwise support a means for transmitting, to a second communications device, a request to update a phase shifter configuration. The response reception component 630 may be configured as or otherwise support a means for receiving, from the second communications device and in response to the request, a response accepting the request to update the phase shifter configuration. The uplink transmission component 635 may be configured as or otherwise support a means for transmitting, to the second communications device, an uplink transmission in accordance with the updated phase shifter configuration based on receiving the response.

In some examples, to support transmitting the request for the update to the phase shifter configuration, the request transmission component 625 may be configured as or otherwise support a means for transmitting, to the second communications device, the request to update the phase shifter configuration from a first phase shifter precision value to a second phase shifter precision value, where the first phase shifter precision value is associated with a higher power consumption than the second phase shifter precision value.

In some examples, the precision value update component 665 may be configured as or otherwise support a means for receiving, from the second communications device and based on transmitting the request, the updated phase shifter configuration in accordance with the second phase shifter precision value.

In some examples, to support receiving the response accepting the update to the phase shifter configuration, the response reception component 630 may be configured as or otherwise support a means for receiving, from the second communications device, an indication of a second phase shifter configuration corresponding to the updated phase shifter configuration, where the second phase shifter configuration is used for reception of the uplink transmission.

In some examples, to support transmitting the request for the update to the phase shifter configuration, the request transmission component 625 may be configured as or otherwise support a means for transmitting, to the second communications device, the request to update the phase shifter configuration from a first phase shifter precision value to a second phase shifter precision value, where the second phase shifter precision value is associated with a lower precision than the first phase shifter precision value. In some examples, the capability component 655 may be configured as or otherwise support a means for determining that the second communications device is capable of supporting a second phase shifter configuration corresponding to the updated phase shifter configuration, where transmitting the request for the update to the phase shifter configuration is based on determining that the second communications device is capable of supporting the second phase shifter configuration.

In some examples, the second phase shifter configuration is associated with a higher precision value and power consumption than the updated phase shifter configuration. In some examples, the phase value component 660 may be configured as or otherwise support a means for applying the updated phase shifter configuration to set one or more phase values, where transmitting the uplink transmission includes transmitting the uplink transmission in accordance with the one or more phase values.

In some examples, the first communications device includes a UE and the second communications device includes a base station or a device with minimal power constraints (for example, an integrated access and backhaul (IAB) node, a repeater, an intelligent reflecting surface (IRS), or a customer premises equipment (CPE)). In some examples, the first communications device includes a first UE and the second communications device includes a second UE.

Additionally or alternatively, the communications manager 620 may support wireless communication at a second communications device in accordance with examples as disclosed herein. The request reception component 640 may be configured as or otherwise support a means for receiving, from a first communications device, a request to update a phase shifter configuration. The response transmission component 645 may be configured as or otherwise support a means for transmitting, to the first communications device and in response to the request, a response accepting the request to update the phase shifter configuration. The uplink reception component 650 may be configured as or otherwise support a means for receiving, from the first communications device, an uplink transmission in accordance with the updated phase shifter configuration based on transmitting the response.

In some examples, to support receiving the request for the update to the phase shifter configuration, the request reception component 640 may be configured as or otherwise support a means for receiving, from the first communications device, the request to update the phase shifter configuration from a first phase shifter precision value to a second phase shifter precision value, where the first phase shifter precision value is associated with a higher power consumption than the second phase shifter precision value.

In some examples, the precision value update component 665 may be configured as or otherwise support a means for transmitting, to the first communications device and based on transmitting the request, the updated phase shifter configuration in accordance with the second phase shifter precision value. In some examples, to support transmitting the response accepting the update to the phase shifter configuration, the response transmission component 645 may be configured as or otherwise support a means for transmitting, to the first communications device, an indication of a second phase shifter configuration corresponding to the updated phase shifter configuration.

In some examples, the phase value component 660 may be configured as or otherwise support a means for applying the second phase shifter configuration to set one or more phase values. In some examples, the uplink reception component 650 may be configured as or otherwise support a means for receiving the uplink transmission in accordance with the one or more phase values.

In some examples, the second phase shifter configuration is associated with a higher precision value and power consumption than the updated phase shifter configuration. In some examples, to support receiving the request for the update to the phase shifter configuration, the request reception component 640 may be configured as or otherwise support a means for receiving, from the first communications device, the request to update the phase shifter configuration from a first phase shifter precision value to a second phase shifter precision value, where the second phase shifter precision value is associated with a lower precision than the first phase shifter precision value.

In some examples, the first communications device includes a UE and the second communications device includes a base station. In some examples, the first communications device includes a first UE and the second communications device includes a second UE.

Figure 7:
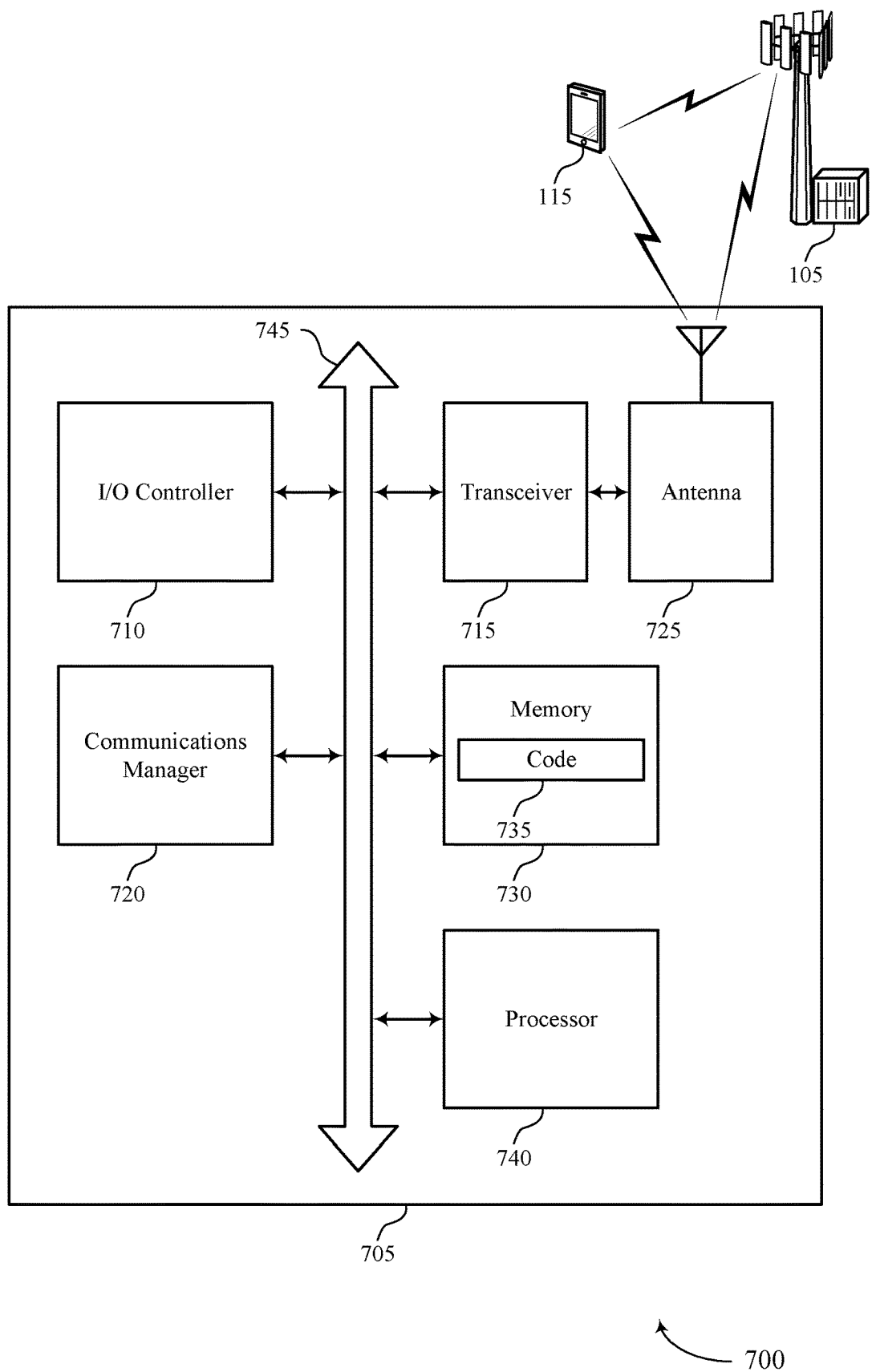
FIG. 7 shows a diagram of a system including a device that supports techniques for enabling power savings with phase shifter configurations in accordance with aspects of the present disclosure.

FIG. 7 shows a diagram of a system 700 including a device 705 that supports techniques for enabling power savings with phase shifter configurations in accordance with aspects of the present disclosure. The device 705 may be an example of or include the components of a device 405, a device 505, a device 605, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for enabling power savings with phase shifter configurations). For example, the device 705 or a component of the device 705 may include a processor 740 and memory 730 coupled to the processor 740, the processor 740 and memory 730 configured to perform various functions described herein.

The communications manager 720 may support wireless communication at a first communications device in accordance with examples as disclosed herein. For example, the communications manager 720 may be configured as or otherwise support a means for transmitting, to a second communications device, a request to update a phase shifter configuration. The communications manager 720 may be configured as or otherwise support a means for receiving, from the second communications device and in response to the request, a response accepting the request to update the phase shifter configuration. The communications manager 720 may be configured as or otherwise support a means for transmitting, to the second communications device, an uplink transmission in accordance with the updated phase shifter configuration based on receiving the response.

Additionally or alternatively, the communications manager 720 may support wireless communication at a second communications device in accordance with examples as disclosed herein. For example, the communications manager 720 may be configured as or otherwise support a means for receiving, from a first communications device, a request to update a phase shifter configuration. The communications manager 720 may be configured as or otherwise support a means for transmitting, to the first communications device and in response to the request, a response accepting the request to update the phase shifter configuration. The communications manager 720 may be configured as or otherwise support a means for receiving, from the first communications device, an uplink transmission in accordance with the updated phase shifter configuration based on transmitting the response.

By including or configuring the communications manager 720 in accordance with examples as described herein, the device 705 may support techniques for improved communication reliability, reduced power consumption, more efficient utilization of communication resources, and longer battery life.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for enabling power savings with phase shifter configurations as described herein, or the processor 740 and the memory 730 may be otherwise configured to perform or support such operations.

Figure 8:
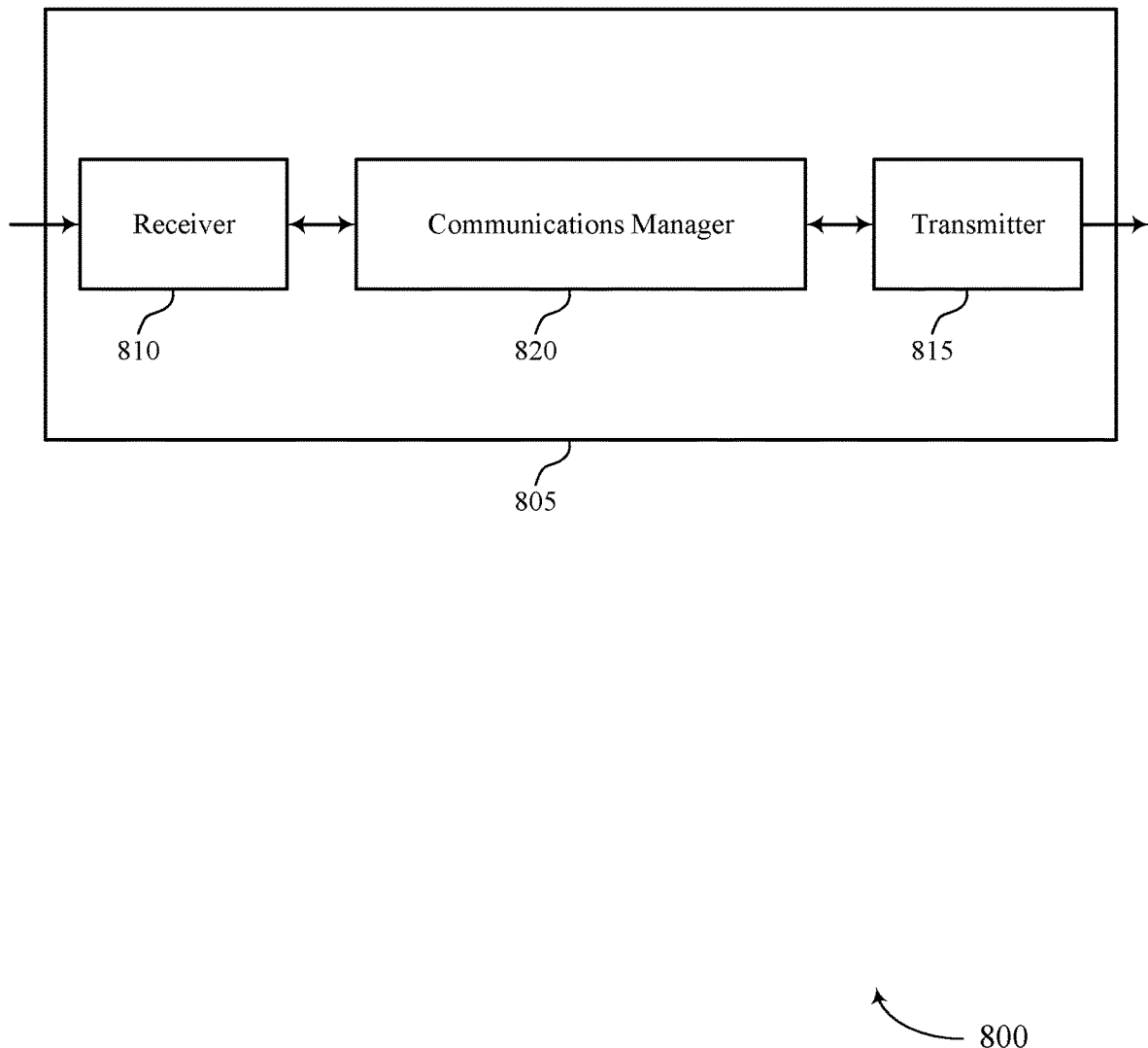
FIGS. 8 and 9 show block diagrams of devices that support techniques for enabling power savings with phase shifter configurations in accordance with aspects of the present disclosure.

FIG. 8 shows a block diagram 800 of a device 805 that supports techniques for enabling power savings with phase shifter configurations in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for enabling power savings with phase shifter configurations). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for enabling power savings with phase shifter configurations). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for enabling power savings with phase shifter configurations as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a second communications device in accordance with examples as disclosed herein. For example, the communications manager 820 may be configured as or otherwise support a means for receiving, from a first communications device, a request to update a phase shifter configuration. The communications manager 820 may be configured as or otherwise support a means for transmitting, to the first communications device and in response to the request, a response accepting the request to update the phase shifter configuration. The communications manager 820 may be configured as or otherwise support a means for receiving, from the first communications device, an uplink transmission in accordance with the updated phase shifter configuration based on transmitting the response.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing and reduced power consumption.

Figure 9:
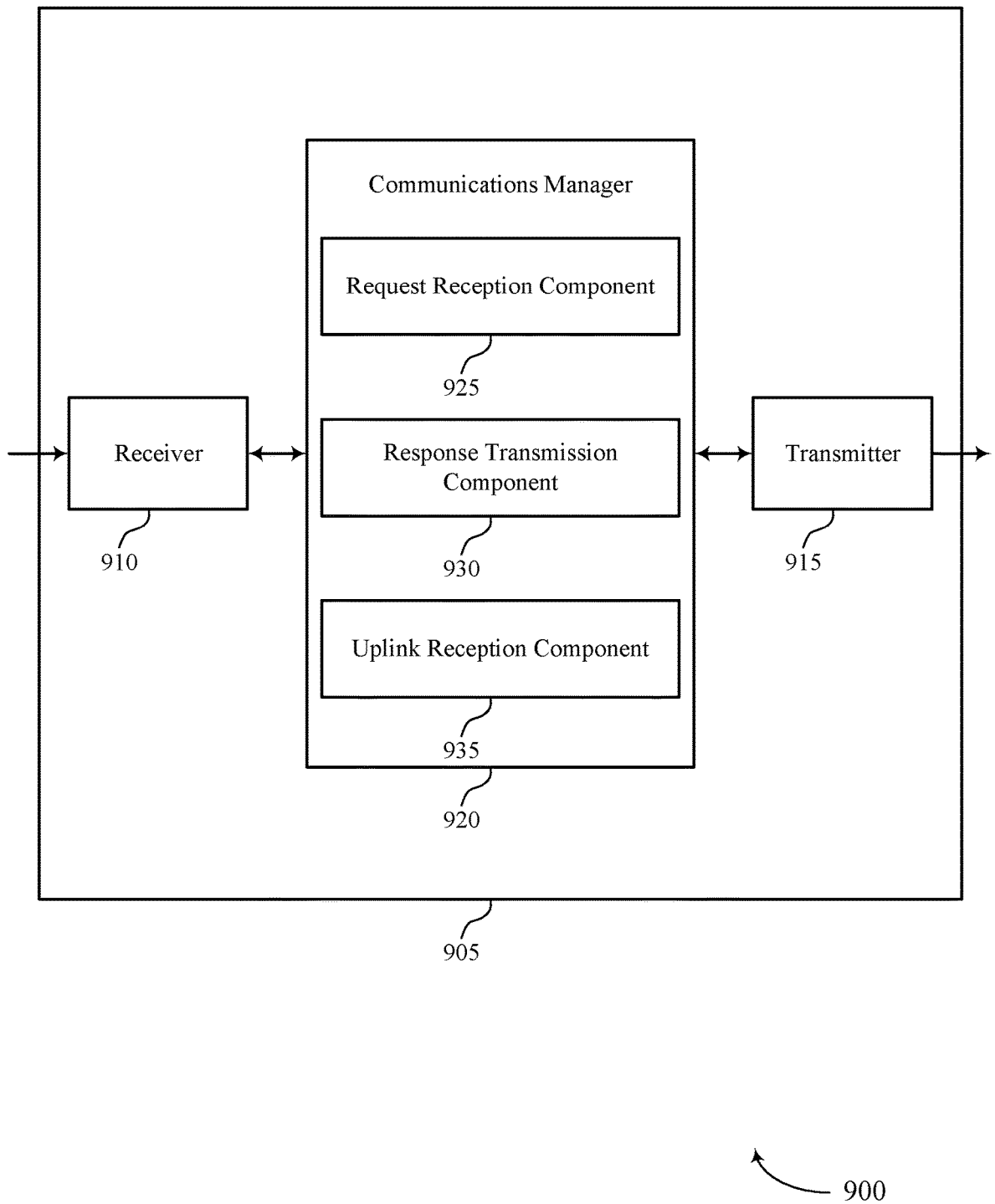

FIG. 9 shows a block diagram 900 of a device 905 that supports techniques for enabling power savings with phase shifter configurations in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for enabling power savings with phase shifter configurations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for enabling power savings with phase shifter configurations). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for enabling power savings with phase shifter configurations as described herein. For example, the communications manager 920 may include a request reception component 925, a response transmission component 930, an uplink reception component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a second communications device in accordance with examples as disclosed herein. The request reception component 925 may be configured as or otherwise support a means for receiving, from a first communications device, a request to update a phase shifter configuration. The response transmission component 930 may be configured as or otherwise support a means for transmitting, to the first communications device and in response to the request, a response accepting the request to update the phase shifter configuration. The uplink reception component 935 may be configured as or otherwise support a means for receiving, from the first communications device, an uplink transmission in accordance with the updated phase shifter configuration based on transmitting the response.

Figure 10:
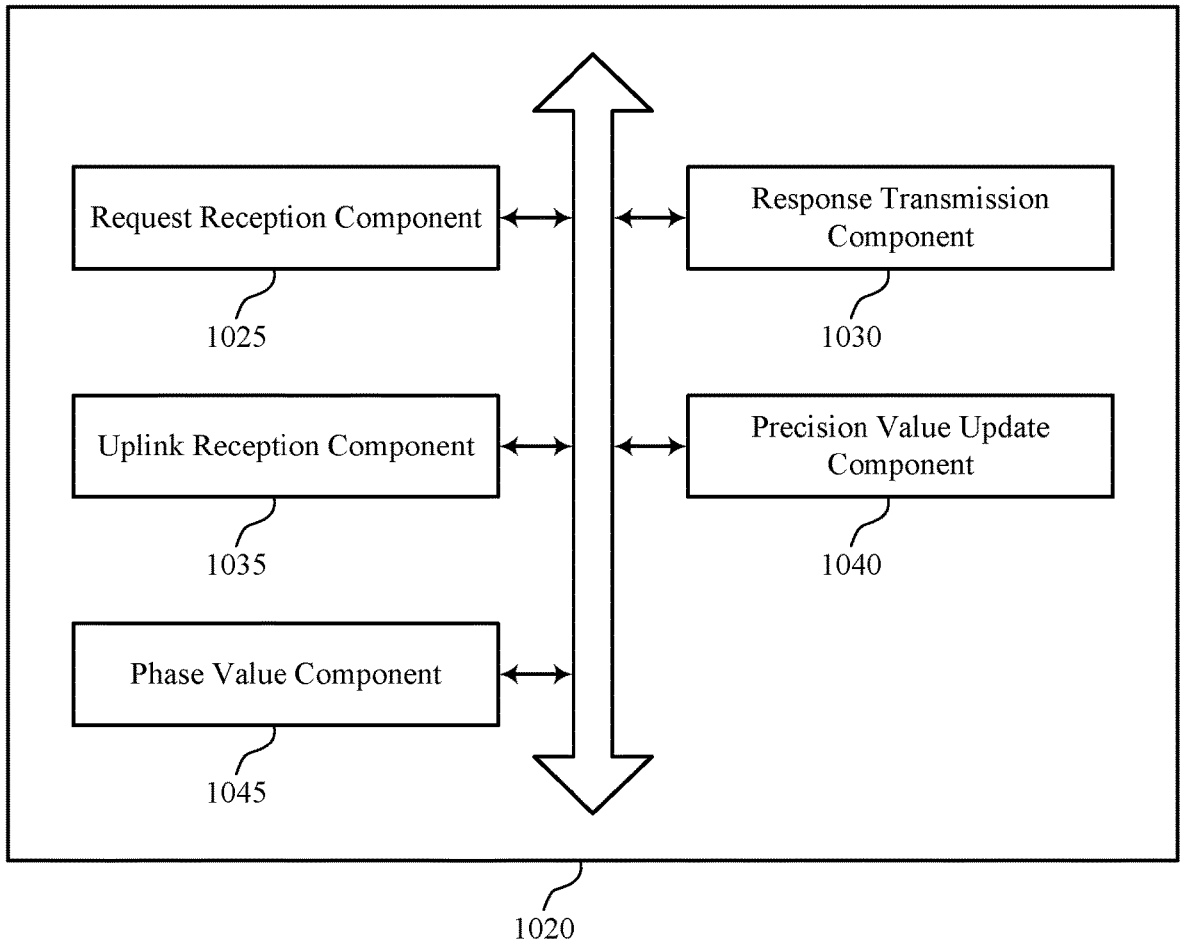
FIG. 10 shows a block diagram of a communications manager that supports techniques for enabling power savings with phase shifter configurations in accordance with aspects of the present disclosure.

FIG. 10 shows a block diagram 1000 of a communications manager 1020 that supports techniques for enabling power savings with phase shifter configurations in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for enabling power savings with phase shifter configurations as described herein. For example, the communications manager 1020 may include a request reception component 1025, a response transmission component 1030, an uplink reception component 1035, a precision value update component 1040, a phase value component 1045, or any combination thereof. Each of these components may communicate, directly or indirectly, with one another (e.g., via one or more buses).

The communications manager 1020 may support wireless communication at a second communications device in accordance with examples as disclosed herein. The request reception component 1025 may be configured as or otherwise support a means for receiving, from a first communications device, a request to update a phase shifter configuration. The response transmission component 1030 may be configured as or otherwise support a means for transmitting, to the first communications device and in response to the request, a response accepting the request to update the phase shifter configuration. The uplink reception component 1035 may be configured as or otherwise support a means for receiving, from the first communications device, an uplink transmission in accordance with the updated phase shifter configuration based on transmitting the response.

In some examples, to support receiving the request for the update to the phase shifter configuration, the request reception component 1025 may be configured as or otherwise support a means for receiving, from the first communications device, the request to update the phase shifter configuration from a first phase shifter precision value to a second phase shifter precision value, where the first phase shifter precision value is associated with a higher power consumption than the second phase shifter precision value.

In some examples, the precision value update component 1040 may be configured as or otherwise support a means for transmitting, to the first communications device and based on transmitting the request, the updated phase shifter configuration in accordance with the second phase shifter precision value. In some examples, to support transmitting the response accepting the update to the phase shifter configuration, the response transmission component 1030 may be configured as or otherwise support a means for transmitting, to the first communications device, an indication of a second phase shifter configuration corresponding to the updated phase shifter configuration.

In some examples, the phase value component 1045 may be configured as or otherwise support a means for applying the second phase shifter configuration to set one or more phase values. In some examples, the uplink reception component 1035 may be configured as or otherwise support a means for receiving the uplink transmission in accordance with the one or more phase values. In some examples, the second phase shifter configuration is associated with a higher precision value and power consumption than the updated phase shifter configuration.

In some examples, to support receiving the request for the update to the phase shifter configuration, the request reception component 1025 may be configured as or otherwise support a means for receiving, from the first communications device, the request to update the phase shifter configuration from a first phase shifter precision value to a second phase shifter precision value, where the second phase shifter precision value is associated with a lower precision than the first phase shifter precision value.

In some examples, the first communications device includes a UE and the second communications device includes a base station. In some examples, the first communications device includes a first UE and the second communications device includes a second UE.

Figure 11:
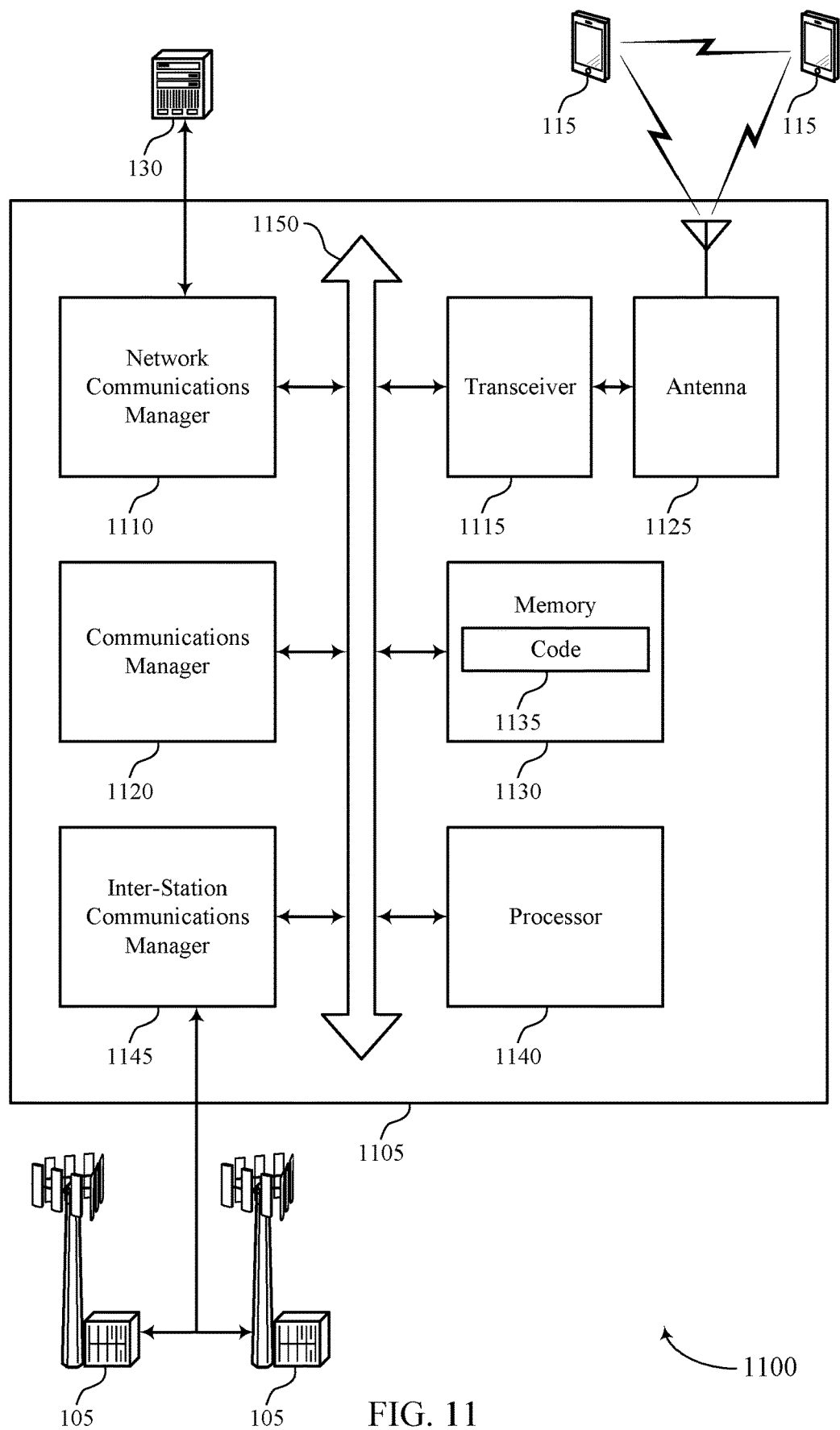
FIG. 11 shows a diagram of a system including a device that supports techniques for enabling power savings with phase shifter configurations in accordance with aspects of the present disclosure.

FIG. 11 shows a diagram of a system 1100 including a device 1105 that supports techniques for enabling power savings with phase shifter configurations in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for enabling power savings with phase shifter configurations). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a second communications device in accordance with examples as disclosed herein. For example, the communications manager 1120 may be configured as or otherwise support a means for receiving, from a first communications device, a request to update a phase shifter configuration. The communications manager 1120 may be configured as or otherwise support a means for transmitting, to the first communications device and in response to the request, a response accepting the request to update the phase shifter configuration. The communications manager 1120 may be configured as or otherwise support a means for receiving, from the first communications device, an uplink transmission in accordance with the updated phase shifter configuration based on transmitting the response.

By including or configuring the communications manager 1120 in accordance with examples as described herein, the device 1105 may support techniques for improved communication reliability, reduced power consumption, more efficient utilization of communication resources, and longer battery life.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for enabling power savings with phase shifter configurations as described herein, or the processor 1140 and the memory 1130 may be otherwise configured to perform or support such operations.

Figure 12:
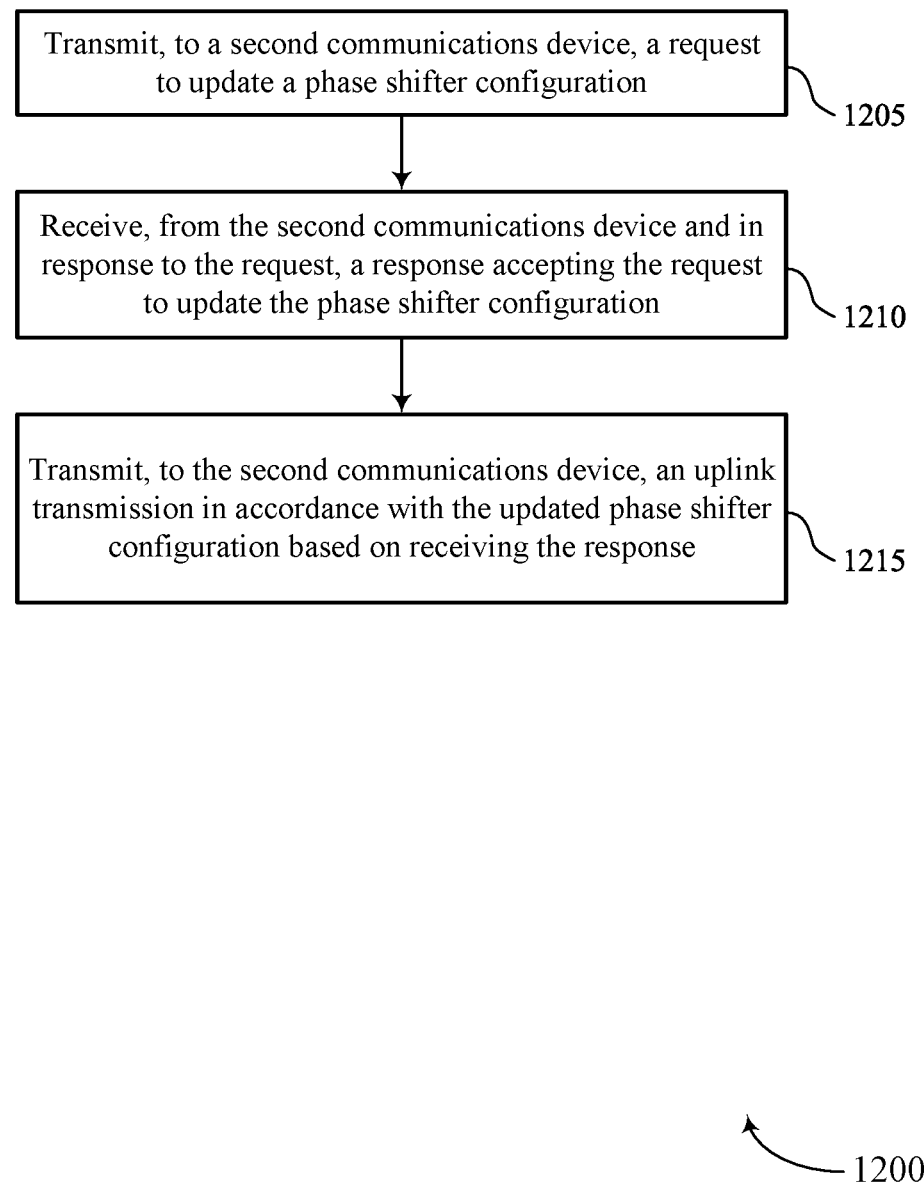
FIGS. 12 through 15 show flowcharts illustrating methods that support techniques for enabling power savings with phase shifter configurations in accordance with aspects of the present disclosure.

FIG. 12 shows a flowchart illustrating a method 1200 that supports techniques for enabling power savings with phase shifter configurations in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include transmitting, to a second communications device, a request to update a phase shifter configuration. The operations of 1205 may be performed in accordance with examples as disclosed herein. In some examples, aspects of the operations of 1205 may be performed by a request transmission component 625 as described with reference to FIG. 6.

At 1210, the method may include receiving, from the second communications device and in response to the request, a response accepting the request to update the phase shifter configuration. The operations of 1210 may be performed in accordance with examples as disclosed herein. In some examples, aspects of the operations of 1210 may be performed by a response reception component 630 as described with reference to FIG. 6.

At 1215, the method may include transmitting, to the second communications device, an uplink transmission in accordance with the updated phase shifter configuration based on receiving the response. The operations of 1215 may be performed in accordance with examples as disclosed herein. In some examples, aspects of the operations of 1215 may be performed by an uplink transmission component 635 as described with reference to FIG. 6.

Figure 13:
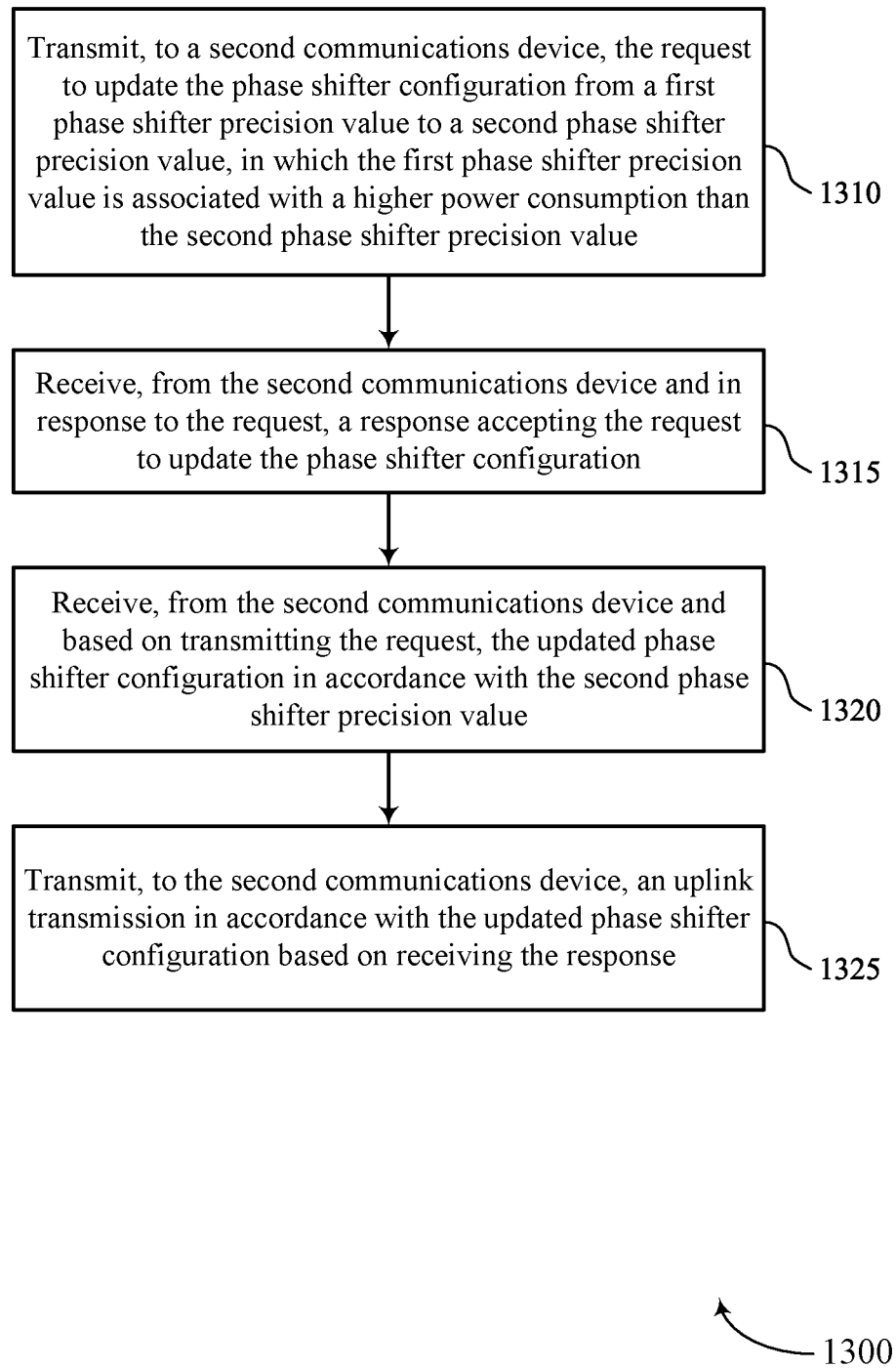

FIG. 13 shows a flowchart illustrating a method 1300 that supports techniques for enabling power savings with phase shifter configurations in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1310, the method may include transmitting, to the second communications device, the request to update the phase shifter configuration from a first phase shifter precision value to a second phase shifter precision value, where the first phase shifter precision value is associated with a higher power consumption than the second phase shifter precision value. The operations of 1310 may be performed in accordance with examples as disclosed herein. In some examples, aspects of the operations of 1310 may be performed by a request transmission component 625 as described with reference to FIG. 6.

At 1315, the method may include receiving, from the second communications device and in response to the request, a response accepting the request to update the phase shifter configuration. The operations of 1315 may be performed in accordance with examples as disclosed herein. In some examples, aspects of the operations of 1315 may be performed by a response reception component 630 as described with reference to FIG. 6.

At 1320, the method may include receiving, from the second communications device and based on transmitting the request, the updated phase shifter configuration in accordance with the second phase shifter precision value. The operations of 1320 may be performed in accordance with examples as disclosed herein. In some examples, aspects of the operations of 1320 may be performed by a precision value update component 665 as described with reference to FIG. 6.

At 1325, the method may include transmitting, to the second communications device, an uplink transmission in accordance with the updated phase shifter configuration based on receiving the response. The operations of 1325 may be performed in accordance with examples as disclosed herein. In some examples, aspects of the operations of 1325 may be performed by an uplink transmission component 635 as described with reference to FIG. 6.

Figure 14:
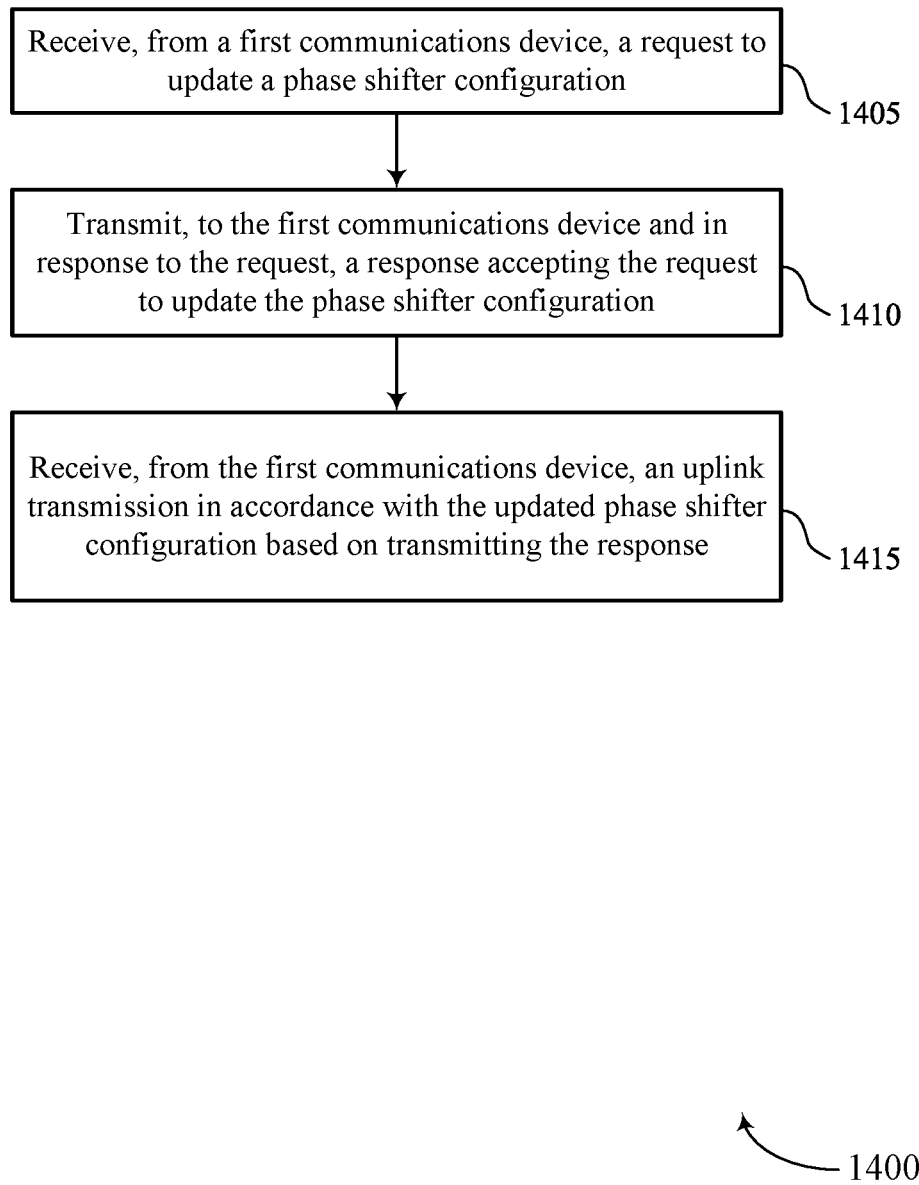

FIG. 14 shows a flowchart illustrating a method 1400 that supports techniques for enabling power savings with phase shifter configurations in accordance with aspects of the present disclosure. The operations of the method 1400 may be implemented by a UE or a base station or its components as described herein. For example, the operations of the method 1400 may be performed by a UE 115 as described with reference to FIGS. 1 through 7 or a base station 105 as described with reference to FIGS. 1 through 3 and 8 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include receiving, from a first communications device, a request to update a phase shifter configuration. The operations of 1405 may be performed in accordance with examples as disclosed herein. In some examples, aspects of the operations of 1405 may be performed by a request reception component 640 or a request reception component 1025 as described with reference to FIGS. 6 and 10.

At 1410, the method may include transmitting, to the first communications device and in response to the request, a response accepting the request to update the phase shifter configuration. The operations of 1410 may be performed in accordance with examples as disclosed herein. In some examples, aspects of the operations of 1410 may be performed by a response transmission component 645 or a response transmission component 1030 as described with reference to FIGS. 6 and 10.

At 1415, the method may include receiving, from the first communications device, an uplink transmission in accordance with the updated phase shifter configuration based on transmitting the response. The operations of 1415 may be performed in accordance with examples as disclosed herein. In some examples, aspects of the operations of 1415 may be performed by an uplink reception component 650 or an uplink reception component 1035 as described with reference to FIGS. 6 and 10.

Figure 15:
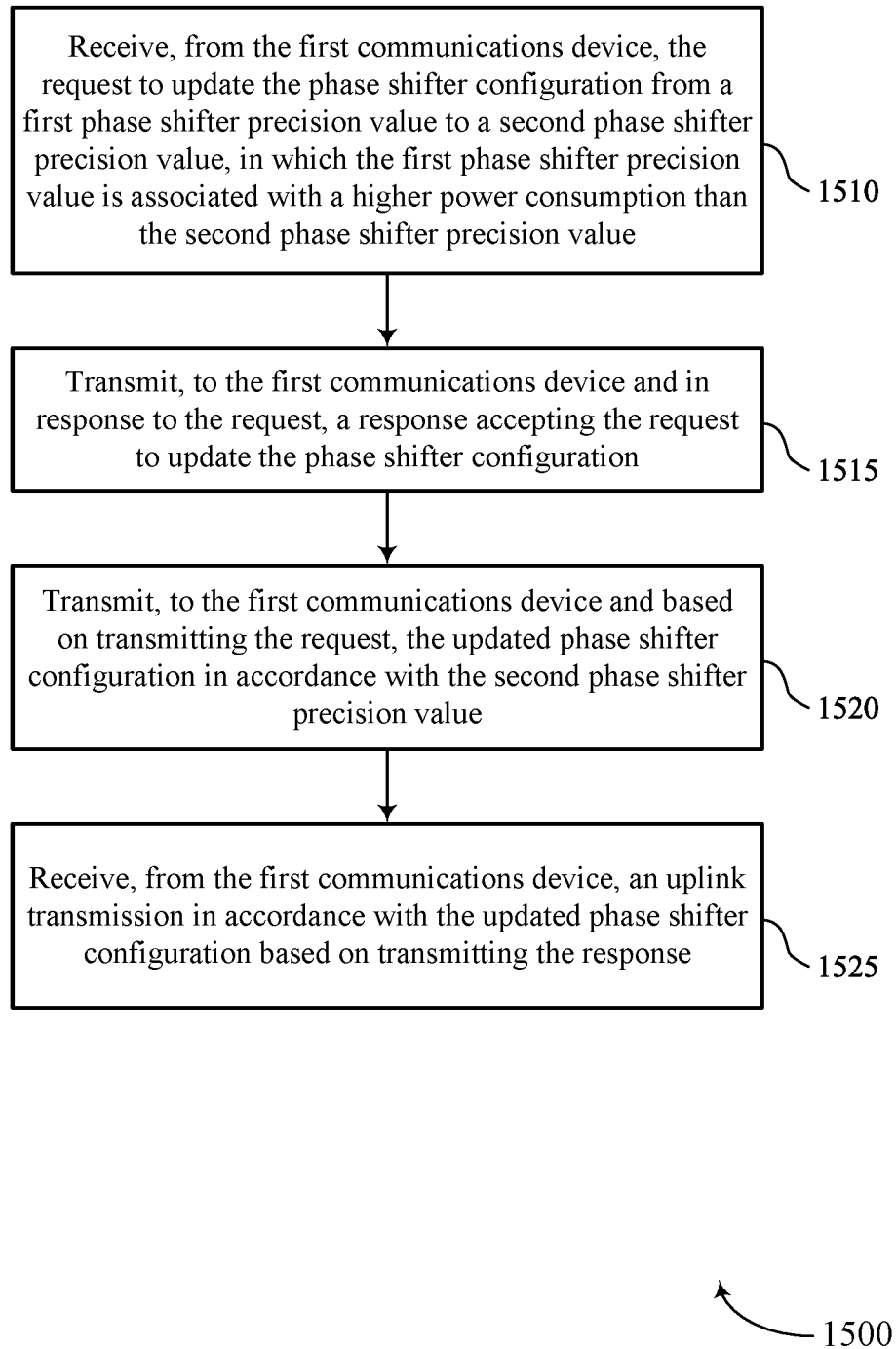

FIG. 15 shows a flowchart illustrating a method 1500 that supports techniques for enabling power savings with phase shifter configurations in accordance with aspects of the present disclosure. The operations of the method 1500 may be implemented by a UE or a base station or its components as described herein. For example, the operations of the method 1500 may be performed by a UE 115 as described with reference to FIGS. 1 through 7 or a base station 105 as described with reference to FIGS. 1 through 3 and 8 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1510, the method may include receiving, from the first communications device, the request to update the phase shifter configuration from a first phase shifter precision value to a second phase shifter precision value, where the first phase shifter precision value is associated with a higher power consumption than the second phase shifter precision value. The operations of 1510 may be performed in accordance with examples as disclosed herein. In some examples, aspects of the operations of 1510 may be performed by a request reception component 640 or a request reception component 1025 as described with reference to FIGS. 6 and 10.

At 1515, the method may include transmitting, to the first communications device and in response to the request, a response accepting the request to update the phase shifter configuration. The operations of 1515 may be performed in accordance with examples as disclosed herein. In some examples, aspects of the operations of 1515 may be performed by a response transmission component 645 or a response transmission component 1030 as described with reference to FIGS. 6 and 10.

At 1520, the method may include transmitting, to the first communications device and based on transmitting the request, the updated phase shifter configuration in accordance with the second phase shifter precision value. The operations of 1520 may be performed in accordance with examples as disclosed herein. In some examples, aspects of the operations of 1520 may be performed by a precision value update component 665 or a precision value update component 1040 as described with reference to FIGS. 6 and 10.

At 1525, the method may include receiving, from the first communications device, an uplink transmission in accordance with the updated phase shifter configuration based on transmitting the response. The operations of 1525 may be performed in accordance with examples as disclosed herein. In some examples, aspects of the operations of 1525 may be performed by an uplink reception component 650 or an uplink reception component 1035 as described with reference to FIGS. 6 and 10.

SUMMARY OF ASPECTS

The following provides an overview of aspects of the present disclosure:

Aspect 1: A method for wireless communication at a first communications device, comprising: transmitting, to a second communications device, a request to update a phase shifter configuration; receiving, from the second communications device and in response to the request, a response accepting the request to update the phase shifter configuration; and transmitting, to the second communications device, an uplink transmission in accordance with the updated phase shifter configuration based at least in part on receiving the response.

Aspect 2: The method of aspect 1, wherein transmitting the request for the update to the phase shifter configuration comprises: transmitting, to the second communications device, the request to update the phase shifter configuration from a first phase shifter precision value to a second phase shifter precision value, wherein the first phase shifter precision value is associated with a higher power consumption than the second phase shifter precision value.

Aspect 3: The method of aspect 2, further comprising: receiving, from the second communications device and based at least in part on transmitting the request, the updated phase shifter configuration in accordance with the second phase shifter precision value.

Aspect 4: The method of any of aspects 1 through 3, wherein receiving the response accepting the update to the phase shifter configuration comprises: receiving, from the second communications device, an indication of a second phase shifter configuration corresponding to the updated phase shifter configuration, wherein the second phase shifter configuration is used for reception of the uplink transmission.

Aspect 5: The method of any of aspects 1 through 4, wherein transmitting the request for the update to the phase shifter configuration comprises: transmitting, to the second communications device, the request to update the phase shifter configuration from a first phase shifter precision value to a second phase shifter precision value, wherein the second phase shifter precision value is associated with a lower precision than the first phase shifter precision value.

Aspect 6: The method of any of aspects 1 through 5, further comprising: determining that the second communications device is capable of supporting a second phase shifter configuration corresponding to the updated phase shifter configuration, wherein transmitting the request for the update to the phase shifter configuration is based at least in part on determining that the second communications device is capable of supporting the second phase shifter configuration.

Aspect 7: The method of aspect 6, wherein the second phase shifter configuration is associated with a higher precision value and power consumption than the updated phase shifter configuration.

Aspect 8: The method of any of aspects 1 through 7, further comprising: applying the updated phase shifter configuration to set one or more phase values, wherein transmitting the uplink transmission comprises transmitting the uplink transmission in accordance with the one or more phase values.

Aspect 9: The method of any of aspects 1 through 8, wherein the first communications device comprises a UE and the second communications device comprises a base station.

Aspect 10: The method of any of aspects 1 through 9, wherein the first communications device comprises a first UE and the second communications device comprises a second UE.

Aspect 11: A method for wireless communication at a second communications device, comprising: receiving, from a first communications device, a request to update a phase shifter configuration; transmitting, to the first communications device and in response to the request, a response accepting the request to update the phase shifter configuration; and receiving, from the first communications device, an uplink transmission in accordance with the updated phase shifter configuration based at least in part on transmitting the response.

Aspect 12: The method of aspect 11, wherein receiving the request for the update to the phase shifter configuration comprises: receiving, from the first communications device, the request to update the phase shifter configuration from a first phase shifter precision value to a second phase shifter precision value, wherein the first phase shifter precision value is associated with a higher power consumption than the second phase shifter precision value.

Aspect 13: The method of aspect 12, further comprising: transmitting, to the first communications device and based at least in part on transmitting the request, the updated phase shifter configuration in accordance with the second phase shifter precision value.

Aspect 14: The method of any of aspects 11 through 13, wherein transmitting the response accepting the update to the phase shifter configuration comprises: transmitting, to the first communications device, an indication of a second phase shifter configuration corresponding to the updated phase shifter configuration.

Aspect 15: The method of aspect 14, further comprising: applying the second phase shifter configuration to set one or more phase values; and receiving the uplink transmission in accordance with the one or more phase values.

Aspect 16: The method of any of aspects 14 through 15, wherein the second phase shifter configuration is associated with a higher precision value and power consumption than the updated phase shifter configuration.

Aspect 17: The method of any of aspects 11 through 16, wherein receiving the request for the update to the phase shifter configuration comprises: receiving, from the first communications device, the request to update the phase shifter configuration from a first phase shifter precision value to a second phase shifter precision value, wherein the second phase shifter precision value is associated with a lower precision than the first phase shifter precision value.

Aspect 18: The method of any of aspects 11 through 17, wherein the first communications device comprises a UE and the second communications device comprises a base station.

Aspect 19: The method of any of aspects 11 through 18, wherein the first communications device comprises a first UE and the second communications device comprises a second UE.

Aspect 20: An apparatus for wireless communication at a first communications device, comprising a processor; memory coupled with the processor; and instructions stored in the memory and executable by the processor to cause the apparatus to perform a method of any of aspects 1 through 10.

Aspect 21: An apparatus for wireless communication at a first communications device, comprising at least one means for performing a method of any of aspects 1 through 10.

Aspect 22: A non-transitory computer-readable medium storing code for wireless communication at a first communications device, the code comprising instructions executable by a processor to perform a method of any of aspects 1 through 10.

Aspect 23: An apparatus for wireless communication at a second communications device, comprising a processor; memory coupled with the processor; and instructions stored in the memory and executable by the processor to cause the apparatus to perform a method of any of aspects 11 through 19.

Aspect 24: An apparatus for wireless communication at a second communications device, comprising at least one means for performing a method of any of aspects 11 through 19.

Aspect 25: A non-transitory computer-readable medium storing code for wireless communication at a second communications device, the code comprising instructions executable by a processor to perform a method of any of aspects 11 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first communications device, comprising:
transmitting, to a second communications device, a request to update a phase shifter configuration;
receiving, from the second communications device and in response to the request, a response accepting the request to update the phase shifter configuration; and
transmitting, to the second communications device, an uplink transmission in accordance with the updated phase shifter configuration based at least in part on receiving the response.

2. The method of claim 1, wherein transmitting the request for the update to the phase shifter configuration comprises:
transmitting, to the second communications device, the request to update the phase shifter configuration from a first phase shifter precision value to a second phase shifter precision value, wherein the first phase shifter precision value is associated with a higher power consumption than the second phase shifter precision value.

3. The method of claim 2, further comprising:
receiving, from the second communications device and based at least in part on transmitting the request, the updated phase shifter configuration in accordance with the second phase shifter precision value.

4. The method of claim 1, wherein receiving the response accepting the update to the phase shifter configuration comprises:
receiving, from the second communications device, an indication of a second phase shifter configuration corresponding to the updated phase shifter configuration, wherein the second phase shifter configuration is used for reception of the uplink transmission.

5. The method of claim 1, wherein transmitting the request for the update to the phase shifter configuration comprises:
transmitting, to the second communications device, the request to update the phase shifter configuration from a first phase shifter precision value to a second phase shifter precision value, wherein the second phase shifter precision value is associated with a lower precision than the first phase shifter precision value.

6. The method of claim 1, further comprising:
determining that the second communications device is capable of supporting a second phase shifter configuration corresponding to the updated phase shifter configuration, wherein transmitting the request for the update to the phase shifter configuration is based at least in part on determining that the second communications device is capable of supporting the second phase shifter configuration.

7. The method of claim 6, wherein the second phase shifter configuration is associated with a higher precision value and power consumption than the updated phase shifter configuration.

8. The method of claim 1, further comprising:
applying the updated phase shifter configuration to set one or more phase values, wherein transmitting the uplink transmission comprises transmitting the uplink transmission in accordance with the one or more phase values.

9. The method of claim 1, wherein the first communications device comprises a user equipment (UE) and the second communications device comprises a base station.

10. The method of claim 1, wherein the first communications device comprises a first user equipment (UE) and the second communications device comprises a second UE.

11. A method for wireless communication at a second communications device, comprising:
receiving, from a first communications device, a request to update a phase shifter configuration;
transmitting, to the first communications device and in response to the request, a response accepting the request to update the phase shifter configuration; and
receiving, from the first communications device, an uplink transmission in accordance with the updated phase shifter configuration based at least in part on transmitting the response.

12. The method of claim 11, wherein receiving the request for the update to the phase shifter configuration comprises:
receiving, from the first communications device, the request to update the phase shifter configuration from a first phase shifter precision value to a second phase shifter precision value, wherein the first phase shifter precision value is associated with a higher power consumption than the second phase shifter precision value.

13. The method of claim 12, further comprising:
transmitting, to the first communications device and based at least in part on transmitting the request, the updated phase shifter configuration in accordance with the second phase shifter precision value.

14. The method of claim 11, wherein transmitting the response accepting the update to the phase shifter configuration comprises:
transmitting, to the first communications device, an indication of a second phase shifter configuration corresponding to the updated phase shifter configuration.

15. The method of claim 14, further comprising:
applying the second phase shifter configuration to set one or more phase values; and
receiving the uplink transmission in accordance with the one or more phase values.

16. The method of claim 14, wherein the second phase shifter configuration is associated with a higher precision value and power consumption than the updated phase shifter configuration.

17. The method of claim 11, wherein receiving the request for the update to the phase shifter configuration comprises:
receiving, from the first communications device, the request to update the phase shifter configuration from a first phase shifter precision value to a second phase shifter precision value, wherein the second phase shifter precision value is associated with a lower precision than the first phase shifter precision value.

18. The method of claim 11, wherein the first communications device comprises a user equipment (UE) and the second communications device comprises a base station.

19. The method of claim 11, wherein the first communications device comprises a first user equipment (UE) and the second communications device comprises a second UE.

20. An apparatus for wireless communication at a first communications device, comprising:
a processor;
memory coupled with the processor; and
instructions stored in the memory and executable by the processor to cause the apparatus to:

transmit, to a second communications device, a request to update a phase shifter configuration;

receive, from the second communications device and in response to the request, a response accepting the request to update the phase shifter configuration; and transmit, to the second communications device, an uplink transmission in accordance with the updated phase shifter configuration based at least in part on receiving the response.

21. The apparatus of claim 20, wherein the instructions to transmit the request for the update to the phase shifter configuration are executable by the processor to cause the apparatus to:

transmit, to the second communications device, the request to update the phase shifter configuration from a first phase shifter precision value to a second phase shifter precision value, wherein the first phase shifter precision value is associated with a higher power consumption than the second phase shifter precision value.

22. The apparatus of claim 21, wherein the instructions are further executable by the processor to cause the apparatus to:

receive, from the second communications device and based at least in part on transmitting the request, the updated phase shifter configuration in accordance with the second phase shifter precision value.

23. The apparatus of claim 20, wherein the instructions to receive the response accepting the update to the phase shifter configuration are executable by the processor to cause the apparatus to:

receive, from the second communications device, an indication of a second phase shifter configuration corresponding to the updated phase shifter configuration, wherein the second phase shifter configuration is used for reception of the uplink transmission.

24. The apparatus of claim 20, wherein the instructions to transmit the request for the update to the phase shifter configuration are executable by the processor to cause the apparatus to:

transmit, to the second communications device, the request to update the phase shifter configuration from a first phase shifter precision value to a second phase shifter precision value, wherein the second phase shifter precision value is associated with a lower precision than the first phase shifter precision value.

25. The apparatus of claim 20, wherein the instructions are further executable by the processor to cause the apparatus to:

determine that the second communications device is capable of supporting a second phase shifter configuration corresponding to the updated phase shifter configuration, wherein transmitting the request for the update to the phase shifter configuration is based at least in part on determining that the second communications device is capable of supporting the second phase shifter configuration.

26. An apparatus for wireless communication at a second communications device, comprising:

a processor;

memory coupled with the processor; and instructions stored in the memory and executable by the processor to cause the apparatus to:

receive, from a first communications device, a request to update a phase shifter configuration;

transmit, to the first communications device and in response to the request, a response accepting the request to update the phase shifter configuration; and receive, from the first communications device, an uplink transmission in accordance with the updated phase shifter configuration based at least in part on transmitting the response.

27. The apparatus of claim 26, wherein the instructions to receive the request for the update to the phase shifter configuration are executable by the processor to cause the apparatus to:

receive, from the first communications device, the request to update the phase shifter configuration from a first phase shifter precision value to a second phase shifter precision value, wherein the first phase shifter precision value is associated with a higher power consumption than the second phase shifter precision value.

28. The apparatus of claim 27, wherein the instructions are further executable by the processor to cause the apparatus to:

transmit, to the first communications device and based at least in part on transmitting the request, the updated phase shifter configuration in accordance with the second phase shifter precision value.

29. The apparatus of claim 26, wherein the instructions to transmit the response accepting the update to the phase shifter configuration are executable by the processor to cause the apparatus to:

transmit, to the first communications device, an indication of a second phase shifter configuration corresponding to the updated phase shifter configuration.

30. The apparatus of claim 29, wherein the instructions are further executable by the processor to cause the apparatus to:

apply the second phase shifter configuration to set one or more phase values; and receive the uplink transmission in accordance with the one or more phase values.

* * * * *